US012119559B2

(12) United States Patent
Jia et al.

(10) Patent No.: US 12,119,559 B2

(45) Date of Patent: Oct. 15, 2024

(54) ANTENNA INCLUDING AT LEAST ONE MICROSTRIP LINE PHASE SHIFTING UNIT HAVING A PHOTO-DIELECTRIC LAYER AND A LIGHT GUIDING STRUCTURE CONFIGURED TO GUIDE LIGHT INTO THE PHOTO-DIELECTRIC LAYER

(71) Applicant: Shanghai Tianma Micro-Electronics Co., Ltd., Shanghai (CN)

(72) Inventors: Zhenyu Jia, Shanghai (CN); Kerui Xi, Shanghai (CN); Zhen Liu, Shanghai (CN); Baiquan Lin, Shanghai (CN); Dengming Lei, Shanghai (CN); Feng Qin, Shanghai (CN); Jing Wang, Shenzhen (CN); Liping Zhang, Shenzhen (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 585 days.

(21) Appl. No.: 17/375,310

(22) Filed: Jul. 14, 2021

(65) Prior Publication Data

US 2022/0285807 A1 Sep. 8, 2022

(30) Foreign Application Priority Data

Mar. 2, 2021 (CN) ........................ 202110231868.2

(51) Int. Cl.

*H01Q 3/26* (2006.01)
*H01P 1/18* (2006.01)

(Continued)

(52) U.S. Cl.

CPC ........... *H01Q 3/2676* (2013.01); *H01P 1/182* (2013.01); *H01P 1/184* (2013.01); *H01Q 3/36* (2013.01);

(Continued)

(58) Field of Classification Search

CPC .. H01P 1/184; H01P 1/18; H01Q 3/36; H01Q 3/2676

(Continued)

(56) References Cited

U.S. PATENT DOCUMENTS 4,263,570 A * 4/1981 De Fonzo et al. ...... H01P 1/182 333/248
5,481,232 A * 1/1996 Wu et al. ................ H01P 1/185 333/161

(Continued)

FOREIGN PATENT DOCUMENTS

CN 103329354 A 9/2013
CN 106571515 A 4/2017
CN 110492253 A 11/2019

*Primary Examiner* — Benny T Lee

(74) *Attorney, Agent, or Firm* — KDW Firm PLLC

(57) ABSTRACT

Provided are a phase shifter, a preparation method thereof, and an antenna. The phase shifter includes at least one phase shifting unit, and the phase shifting unit includes a microstrip line, a photo-dielectric layer, a ground electrode, and at least one light guiding structure; the microstrip line is located on a side of the photo-dielectric layer, and the ground electrode is located on a side of the photo-dielectric layer facing away from the microstrip line; the light-guiding structure at least partially overlaps the photo-dielectric layer, and the light-guiding structure is configured to guide light into the photo-dielectric layer.

16 Claims, 17 Drawing Sheets

(51) Int. Cl.
*H01Q 3/36* (2006.01)
*H01Q 15/14* (2006.01)

(52) U.S. Cl.
CPC ......... *H01Q 15/147* (2013.01); *H01Q 15/148* (2013.01)

(58) Field of Classification Search
USPC .......................................................... 333/161
See application file for complete search history.

(56) References Cited

U.S. PATENT DOCUMENTS

| | | | | |
|---|---|---|---|---|
| 6,879,289 | B2 * | 4/2005 | Hayes | H01P 1/2005<br>343/770 |
| 2004/0130491 | A1 | 7/2004 | Hayes | |

* cited by examiner

ANTENNA INCLUDING AT LEAST ONE MICROSTRIP LINE PHASE SHIFTING UNIT HAVING A PHOTO-DIELECTRIC LAYER AND A LIGHT GUIDING STRUCTURE CONFIGURED TO GUIDE LIGHT INTO THE PHOTO-DIELECTRIC LAYER

CROSS-REFERENCE TO RELATED APPLICATION(S)

This application claims priority to Chinese Patent Application No. 202110231868.2 filed Mar. 2, 2021, the disclosure of which is incorporated herein by reference in its entirety.

TECHNICAL FIELD

Embodiments of the present disclosure relate to the field of communication technologies and in particular, to a phase shifter, a preparation method thereof, and an antenna.

BACKGROUND

The phased array antenna is an important radio device that transmits and receives electromagnetic waves. The phased array antenna controls the feeder phase of the radiation element in the array antenna by a phase shifter so that the radiation direction of the antenna is changed, and thus the purpose of beam scanning is achieved.

In the phase shifter of existing phased array antenna, the beam scanning function is achieved by using a separate transceiver chip (T/R component). However, the price of the transceiver chip is relatively expensive so that the phase shifter of existing phased array antenna is extremely expensive, it is difficult to achieve large-scale commercialization, and thus the promotion of the phased array antenna in the field of consumer electronics is limited.

SUMMARY OF THE INVENTION

The present disclosure provides a phase shifter, a preparation method thereof, and an antenna so that the cost is reduced and more possibilities are provided for large-scale commercialization.

In a first aspect, embodiments of the present disclosure provide a phase shifter. The phase shifter includes at least one phase shifting unit.

Each of the at least one phase shifting unit includes a microstrip line, a photo-dielectric layer, a ground electrode, and at least one light guiding structure.

The microstrip line is located on a side of the photo-dielectric layer, and the ground electrode is located on a side of the photo-dielectric layer facing away from the microstrip line.

The at least one light guiding structure at least partially overlaps the photo-dielectric layer, and the at least one light guiding structure is configured to guide light into the photo-dielectric layer.

In a second aspect, embodiments of the present disclosure further provide an antenna.

The antenna includes the phase shifter described in the first aspect.

In a third aspect, embodiments of the present disclosure further provide a preparation method of a phase shifter. The method includes the steps described blow.

A photo-dielectric layer is provided.

A microstrip line is prepared on a side of the photo-dielectric layer, a ground electrode is prepared on a side of the photo-dielectric layer facing away from the microstrip line, and at least one light guiding structure is prepared so that at least one phase shifting unit is formed, where the at least one light guiding structure at least partially overlaps the photo-dielectric layer.

In the phase shifter provided in embodiments of the present disclosure, the photo-dielectric layer is provided between the microstrip line and the ground electrode, and at least one light guiding structure is provided to guide light into the photo-dielectric layer so that the dielectric constant of the photo-dielectric layer is controlled to change through application of light, and thus the phase shift of radio frequency signals transmitted on the microstrip line is controlled. Compared with the phase shifter in the related art, in the phase shifter provided in embodiments of the present disclosure, the expensive phase shifter chip is replaced with a relatively low-priced photo-dielectric layer so that while the phase shift of the radio frequency signals is achieved, the manufacturing cost is reduced and more possibilities are provided for large-scale commercialization.

DETAILED DESCRIPTION OF THE INVENTION

Figure 1:
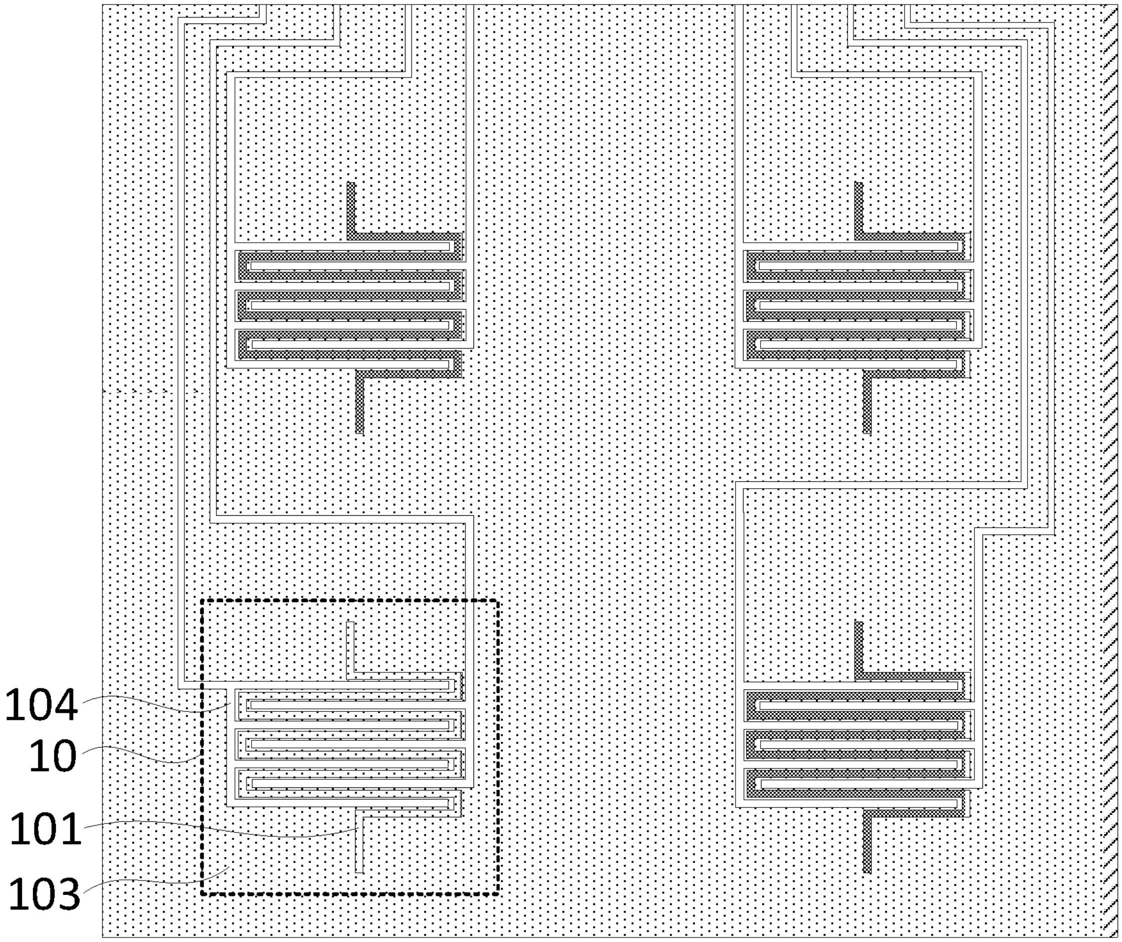
FIG. 1 is a structure diagram of a phase shifter according to an embodiment of the present disclosure.

The present disclosure is further described hereinafter in detail in conjunction with drawings and embodiments where like features are denoted by the same reference labels throughout the detail description of the drawings. It is to be understood that embodiments described hereinafter are intended to explain the present disclosure and not to limit the present disclosure. Additionally, it is to be noted that for ease of description, only part, not all, of structures related to the present disclosure are illustrated in the drawings.

Figure 2:
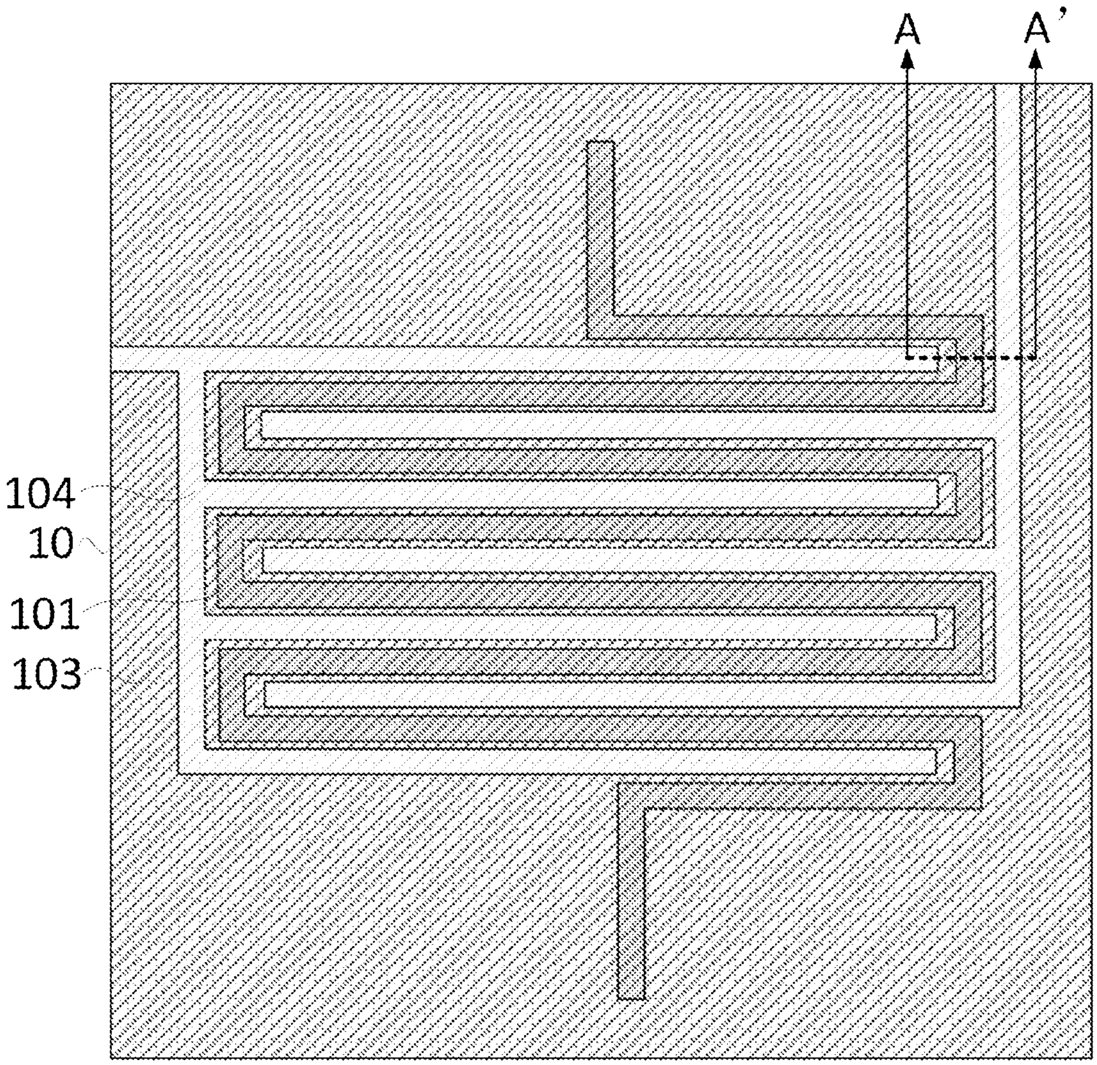
FIG. 2 is a structure diagram of a phase shifting unit according to an embodiment of the present disclosure.
Figure 3:
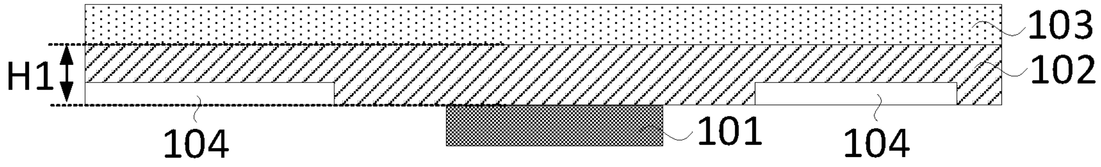
FIG. 3 is a sectional diagram of FIG. 2 taken along the A-A' direction.

FIG. 1 is a structure diagram of a phase shifter according to an embodiment of the present disclosure, FIG. 2 is a structure diagram of a phase shifting unit according to an embodiment of the present disclosure, and FIG. 3 is a sectional diagram of FIG. 2 taken along the A-A' direction. As shown in FIGS. 1 to 3, the phase shifter provided in embodiments of the present disclosure includes at least one phase shifting unit 10; each of the at least one phase shifting unit 10 includes a microstrip line 101, a photo-dielectric layer 102, a ground electrode 103, and at least one light guiding structure 104; the microstrip line 101 is located on a side of the photo-dielectric layer 102, and the ground electrode 103 is located on a side of the photo-dielectric layer 102 facing away from the microstrip line 101; the at least one light guiding structure 104 at least partially overlaps the photo-dielectric layer 102, and the at least one light guiding structure 104 is configured to guide light into the photo-dielectric layer 102.

Specifically, as shown in FIGS. 1 to 3, the phase shifter includes at least one phase shifting unit 10, and each of the at least one phase shifting unit 10 includes a photo-dielectric layer 102. The dielectric constant of the photo-dielectric layer 102 is changed according to different lights. Light is introduced into the photo-dielectric layer 102 so that the structure and morphology of material molecules in the photo-dielectric layer 102 are changed, and then the anisotropy of physical properties of the material is modulated. In this manner, the dielectric constant of the photo-dielectric layer 102 is changed. The optical parameters that affect the material properties are the light intensity and light wavelength. For example, the dielectric constant of the photo-dielectric layer 102 may be controlled to change by controlling the light intensity of the light; or the dielectric constant of the photo-dielectric layer 102 may be controlled to change by controlling the wavelength of the light, which is not limited in this embodiment as long as the dielectric constant of the photo-dielectric layer 102 may be changed. For example, in the case where the dielectric constant of the photo-dielectric layer 102 is controlled by controlling the light wavelength of the light, the wavelength range of the light of the photo-dielectric layer may be controlled to be 390 nm to 577 nm. It may be that the wavelength range of green light is 492 nm to 577 nm, and the wavelength range of blue-violet light is 390 nm to 492 nm. That is, the dielectric constant of the photo-dielectric layer 102 may be controlled by using green light or blue-violet light. Embodiments of the present disclosure do not limit the material of the photo-dielectric layer 102, and those skilled in the art can make a selection according to the actual situation as long as the phase shift of radio frequency signals transmitted on the microstrip line 101 may be performed through the photo-dielectric layer 102 to change the phases of the radio frequency signals. In an embodiment, the material of the photo-dielectric layer 102 may include liquid crystal polymer, azo dye, and azo polymer.

It is to be noted that the material of the photo-dielectric layer 102 may be a solid material. Compared with a liquid material, the solid properties of the photo-dielectric layer 102 may improve the thickness uniformity to a certain extent and reduce the thickness change caused by the external pressure, and thus the influence of the thickness change on the phase shift performance of the phase shifter is reduced, which is conducive to improving the accuracy of the phase shift.

With continued reference to FIGS. 1 to 3, each of the at least one phase shifting unit 10 further includes the microstrip line 101 and the ground electrode 103. In this embodiment, the microstrip line 101 is located on a side of the photo-dielectric layer 102, and the ground electrode 103 is located on a side of the photo-dielectric layer 102 facing away from the microstrip line 101; the microstrip line 101 is configured to transmit radio frequency signals, and the radio frequency signals are transmitted between the microstrip line 101 and the ground electrode 103. Specifically, as shown in FIGS. 1 to 3, the photo-dielectric layer 102 overlaps the microstrip line 101, the microstrip line 101 and the ground electrode 103 are respectively located on two opposite sides of the photo-dielectric layer 102, and the radio frequency signals are transmitted in the photo-dielectric layer 102 between the microstrip line 101 and the ground electrode 103. Due to the change of the dielectric constant of the photo-dielectric layer 102 (the photo-dielectric layer 102 is affected by the light intensity or wavelength of the light so that the dielectric constant of the photo-dielectric layer 102 is changed), the phase shift of the radio frequency signals transmitted on the microstrip line 101 occurs so that the phases of the radio frequency signals are changed, and the phase shift function of the radio frequency signals is achieved.

It is to be understood that the photo-dielectric layer 102 overlaps the microstrip line 101, and it is feasible that the photo-dielectric layer 102 partially overlaps the microstrip line 101; it is also feasible that the photo-dielectric layer 102 coincides with the microstrip line 101; it is also feasible that the microstrip line 101 is located within the vertical projection of the photo-dielectric layer 102 on a plane where the microstrip line 101 is located. It is also to be understood that the photo-dielectric layer 102 overlaps the microstrip line 101, and it is feasible that along the thickness direction of the photo-dielectric layer 102, the photo-dielectric layer 102 overlaps the microstrip line 101. In an embodiment, in the case where the microstrip line 101 is located in one plane, the photo-dielectric layer 102 overlaps the microstrip line 101, and it is feasible that the vertical projection of the photo-dielectric layer 102 on the plane where the microstrip line 101 is located overlaps the microstrip line 101.

With continued reference to FIGS. 1 to 3, each of the at least one phase shifting unit 10 further includes at least one light guiding structure 104; the at least one light guiding structure 104 at least partially overlaps the photo-dielectric layer 102; the at least one light guiding structure 104 is configured to guide light into the photo-dielectric layer 102 so that the dielectric constant of the photo-dielectric layer 102 is changed, and thus the phase shift control of the radio frequency signals transmitted on the microstrip line 101 is achieved. It is to be understood that the at least one light guiding structure 104 may partially overlap the photo-dielectric layer 102, or the vertical projection of the at least one light guiding structure 104 in a plane where the photo-dielectric layer 102 is located is within the photo-dielectric layer 102; further, it is feasible that along the thickness direction of the photo-dielectric layer 102, the photo-dielectric layer 102 overlaps the at least one light guiding structure 104. Those skilled in the art can set the position of the at least one light guiding structure 104 according to the actual requirements as long as the light may be guided into the photo-dielectric layer 102.

It is to be noted that the phase shifter may include one phase shifting unit 10, the phase shifting unit 10 includes one microstrip line 101, and the phase shifting unit 10 is configured to achieve the phase shift function of the radio frequency signals transmitted on the microstrip line 101. In other embodiments, the phase shifter may further include multiple phase shifting units 10 distributed in an array so that the phase shift of the radio frequency signals transmitted on multiple microstrip lines 101 is performed. In FIG. 1, only the case where the phase shifter includes four phase shifting units is used as an example. In other embodiments, those skilled in the art can set the number and layout of the phase shifting units 10 according to the actual requirements, which is not limited in embodiments of the present disclosure.

In the phase shifter provided in embodiments of the present disclosure, the photo-dielectric layer 102 is provided between the microstrip line 101 and the ground electrode 103, and at least one light guiding structure 104 is provided to guide light into the photo-dielectric layer 102 so that the dielectric constant of the photo-dielectric layer 102 is controlled to change through light, and thus the phase shift of the radio frequency signals transmitted on the microstrip line 101 is controlled. Compared with the phase shifter in the related art, in the phase shifter provided in embodiments of the present disclosure, the expensive phase shifter chip is replaced with a relatively low-priced photo-dielectric layer 102 so that while the phase shift of the radio frequency signals is achieved, the structure is simple, the cost is low, the manufacturing cost is reduced, and more possibilities are provided for large-scale commercialization. Further, to ensure the phase shift performance of the phase shifter, the thickness of the phase shifter needs to be as uniform as possible. Compared with the use of a liquid material as a dielectric layer whose dielectric constant is changed, the photo-dielectric layer is used so that the uniform thickness of the phase shifter is ensured, which is conducive to improving the accuracy of the phase shift. Further, the phase shifter provided in the present disclosure only needs to use light to control the change of the dielectric constant of the photo-dielectric layer. Compared with the use of electrical control to control the dielectric constant of the dielectric layer, the electrode or the wiring of the potential does not need to be made or provided additionally so that the manufacturing process and the preparation process are simplified, which is conducive to controlling the cost.

With continued reference to FIGS. 1 to 3, in an embodiment, the light guiding structure 104 is located on a side of the microstrip line 101 facing away from the ground electrode 103, and/or the light guiding structure 104 is located on a side of the microstrip line 101 facing the ground electrode 103.

The light guiding structure 104 may be located on aside of the microstrip line 101 facing away from the ground electrode 103, or the light guiding structure 104 may be located on a side of the microstrip line 101 facing the ground electrode 103, or a side of the microstrip line 101 facing away from the ground electrode 103 and a side of the microstrip line 101 facing the ground electrode 103 are both provided with the light guiding structure 104 so that light is guided into the photo-dielectric layer 102, and thus the dielectric constant of the photo-dielectric layer 102 is controlled to change by the light, and the phase shift control of the radio frequency signals transmitted on the microstrip line 101 is achieved, which is not limited in embodiments of the present disclosure.

Specifically, as shown in FIG. 3, in the case where the light guiding structure 104 is located on the side of the microstrip line 101 facing the ground electrode 103 is used as an example. The light guiding structure 104 may be disposed on a side of the photo-dielectric layer 102 facing the microstrip line 101. For example, the light guiding structure 104 is an optical fiber or a light guiding plate disposed on a side of the photo-dielectric layer 102 facing the microstrip line 101, or the light guiding structure 104 may also be disposed in a groove on a side of the photo-dielectric layer 102 facing the microstrip line 101. The surface of the groove is covered with an opaque material so that light is confined in the light guiding structure 104, and thus light leakage and a large amount of light loss during the transmission of the light in the light guiding structure 104 are avoided.

Figure 4:
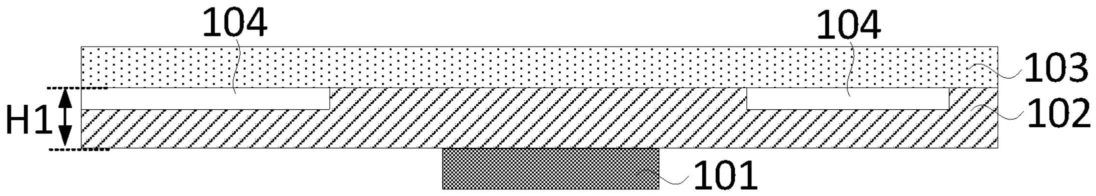
FIG. 4 is a partial sectional diagram of a phase shifter according to an embodiment of the present disclosure.

FIG. 4 is a partial sectional diagram of a phase shifter according to an embodiment of the present disclosure. As shown in FIG. 4, in an embodiment, the light guiding structure 104 is disposed on a side of the photo-dielectric layer 102 facing away from the microstrip line 101. For example, the light guiding structure 104 is an optical fiber or a light guiding plate disposed on a side of the photo-dielectric layer 102 facing away from the microstrip line 101, or the light guiding structure 104 may also be disposed in a groove on a side of the photo-dielectric layer 102 facing away from the microstrip line 101. The surface of the groove is covered with an opaque material so that light is confined in the light guiding structure 104, and thus light leakage and a large amount of light loss during the transmission of the light in the light guiding structure 104 are avoided.

The light guiding structure 104 is disposed on a side of the photo-dielectric layer 102 facing the microstrip line 101, or the light guiding structure 104 is disposed on a side of the photo-dielectric layer 102 facing away from the microstrip line 101. In this manner, the thickness of the phase shifter is reduced, which is conducive to achieving a miniaturized phase shifter.

In other embodiments, the light guiding structure 104 may also be disposed on a side of the ground electrode 103 facing away from the microstrip line 101, or the light guiding structure 104 may be disposed on a side of the microstrip line 101 facing away from the ground electrode 103 so that the influence of the light guiding structure 104 on the thickness of the photo-dielectric layer 102 is reduced, and the accuracy of the phase shift of the photo-dielectric layer 102 is improved, which can be set by those skilled in the art according to the actual requirements.

Figure 5:
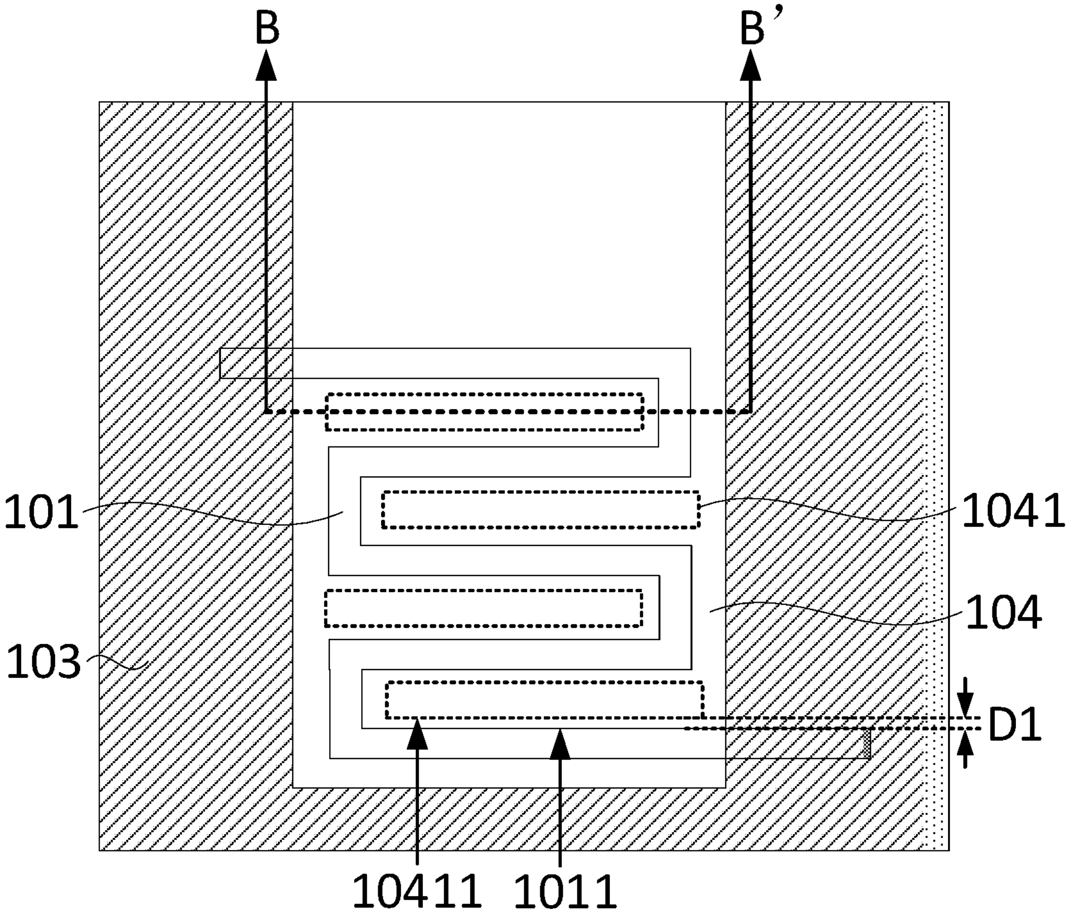
FIG. 5 is a structure diagram of another phase shifter according to an embodiment of the present disclosure.
Figure 6:
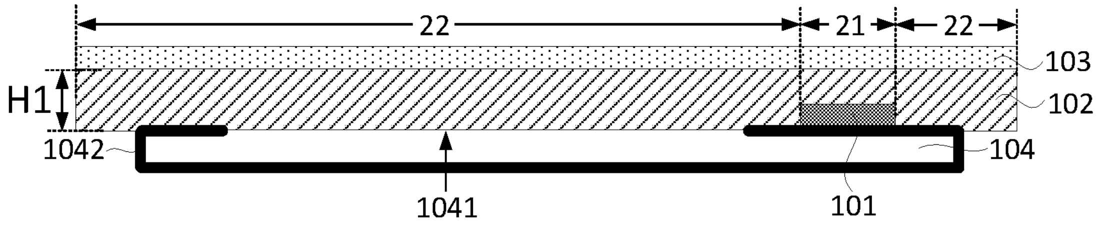
FIG. 6 is a sectional diagram of FIG. 5 taken along the B-B' direction.

FIG. 5 is a structure diagram of another phase shifter according to an embodiment of the present disclosure, and FIG. 6 is a sectional diagram of FIG. 5 taken along the B-B' direction. As shown in FIGS. 5 and 6, in an embodiment, the light guiding structure 104 includes a light output opening 1041, and the vertical projection of the light output opening 1041 on the plane where the microstrip line 101 is located does not overlap the microstrip line 101.

In an embodiment, as shown in FIG. 6, in the case where the light guiding structure 104 is located on a side of the microstrip line 101 facing away from the ground electrode 103 is used as an example. The light guiding structure 104 may be provided additionally. Specifically, when the phase shifter is prepared, the light guiding structure 104 may be prepared independently, and then the light guiding structure 104 is directly bonded to a side of the microstrip line 101 facing away from the ground electrode 103 so that the preparation process of the phase shifter is modularized. If the light guiding structure 104 has defects, only the light guiding structure 104 is replaced and the entire phase shifter does not need to be discarded, which is conducive to reducing the production cost.

With continued reference to FIGS. 5 and 6, the light guiding structure 104 includes the light output opening 1041, and light may be output only from the light output opening 1041 so that light leakage and a large amount of light loss during the transmission of the light in the light guiding structure 104 are avoided. For example, as shown in FIG. 6, the light guiding structure 104 is configured as a closed structure covered by an opaque material 1042. When light is transmitted in the light guiding structure 104, the opaque material 1042 confines the light in the closed structure so that light leakage and a large amount of light loss during the transmission of the light in the light guiding structure 104 are avoided; the opaque material 1042 is removed at the light output opening 1041 of the light guiding structure 104 so that the light is output from the light output opening 1041.

It is to be noted that the opaque material 1042 may be an opaque material, and the opaque material 1042 may also be a material that only blocks the light to which the photo-dielectric layer 102 is able to respond. The so-called light to which the photo-dielectric layer 102 is able to respond may satisfy the following condition: in the case where the light is irradiated to the photo-dielectric layer 102, the dielectric constant of the photo-dielectric layer 102 is changed. For example, the light to which the photo-dielectric layer 102 is able to respond is blue light, and the opaque material 1042 blocks blue light.

Further, the vertical projection of the light output opening 1041 on the plane where the microstrip line 101 is located does not overlap the microstrip line 101. It is to be understood that the case where the vertical projection of the light output opening 1041 on the plane where the microstrip line 101 is located does not overlap the microstrip line 101 indicates that no overlapping area between the light output opening 1041 and the microstrip line 101 along the thickness direction of the microstrip line 101 exists so that the light output from the light output opening 1041 may be prevented from being blocked by the microstrip line 101, it is ensured that the light is guided into the photo-dielectric layer 102 between the microstrip line 101 and the ground electrode 103, and thus the dielectric constant of the photo-dielectric layer 102 is changed, and the phase shift control of the radio frequency signals transmitted on the microstrip line 101 is achieved.

In an embodiment, as shown in FIG. 6, the phase shifter provided in embodiments of the present disclosure includes a microstrip-line arrangement area 21 and a non-microstrip-line arrangement area 22. Along the thickness direction of the microstrip line 101, the microstrip line 101 coincides with the microstrip-line arrangement area 21, that is, along the thickness direction of the microstrip line 101, the edge of the microstrip-line arrangement area 21 coincides with the edge of the microstrip line 101, and the non-microstrip-line arrangement area 22 covers the light output opening 1041 so that the light output from the light output opening 1041 can be prevented from being blocked by the microstrip line 101.

With continued reference to FIG. 5, in an embodiment, along the direction parallel to the plane where the photo-dielectric layer 102 is located, the light output opening 1041 includes a first boundary 10411, and the first boundary 10411 is a boundary of a side of the light output opening 1041 facing the microstrip line 101; the microstrip line 101 includes a second boundary 1011, and the second boundary 1011 is a boundary of a side of the microstrip line 101 facing the light output opening 1041. The shortest distance between the first boundary 10411 and the second boundary 1011 is D1, where $0<D1\leq 2$ mm.

As shown in FIG. 5, if the shortest distance D1 between the first boundary 10411 and the second boundary 1011 is too great, the distance between the light output opening 1041 and the photo-dielectric layer 102 between the microstrip line 101 and the ground electrode 103 is relatively great so that when propagating to the photo-dielectric layer 102 between the microstrip line 101 and the ground electrode 103, the light output from the light output opening 1041 is greatly attenuated, and thus the light utilization efficiency is reduced. In embodiments of the present disclosure, the shortest distance D1 between the first boundary 10411 of the light output opening 1041 and the second boundary 1011 of the microstrip line 101 satisfies 0<D1≤2 mm so that the light output opening 1041 is relatively facing the photo-dielectric layer 102 between the microstrip line 101 and the ground electrode 103, which is conducive to improving the light utilization efficiency.

Figure 7:
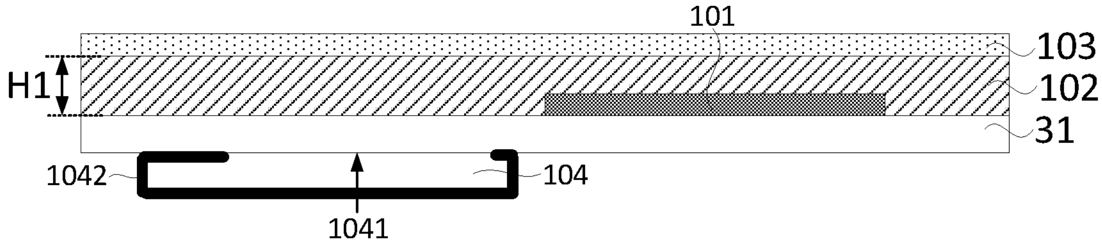
FIG. 7 is a partial sectional diagram of another phase shifter according to an embodiment of the present disclosure.

FIG. 7 is a partial sectional diagram of another phase shifter according to an embodiment of the present disclosure. In an embodiment, the phase shifter provided in embodiments of the present disclosure further includes a first substrate 31, the first substrate 31 is located on a side of the microstrip line 101 facing away from the ground electrode 103, and the light guiding structure 104 is located on the first substrate 31.

As shown in FIG. 7, the first substrate 31 is disposed on a side of the microstrip line 101 facing away from the ground electrode 103 so that the first substrate 31 can support and protect the phase shifter and improve the robustness of the phase shifter. Further, when the light guiding structure 104 is prepared, the first substrate 31 may be used as a carrier, and the light guiding structure 104, the microstrip line 101, and the photo-dielectric layer 102 are prepared on the first substrate 31 so that the difficulty of preparing the phase shifter is reduced.

Figure 8:
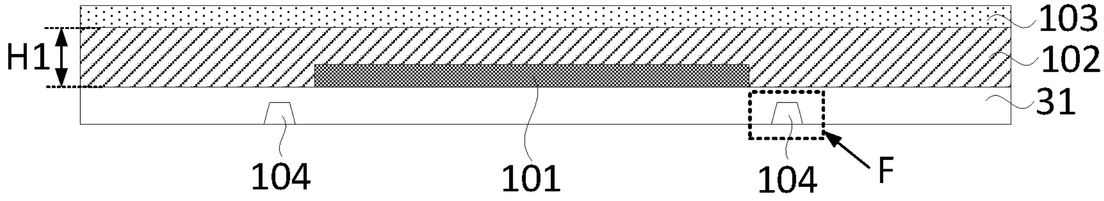
FIG. 8 is a partial sectional diagram of another phase shifter according to an embodiment of the present disclosure.
Figure 9:
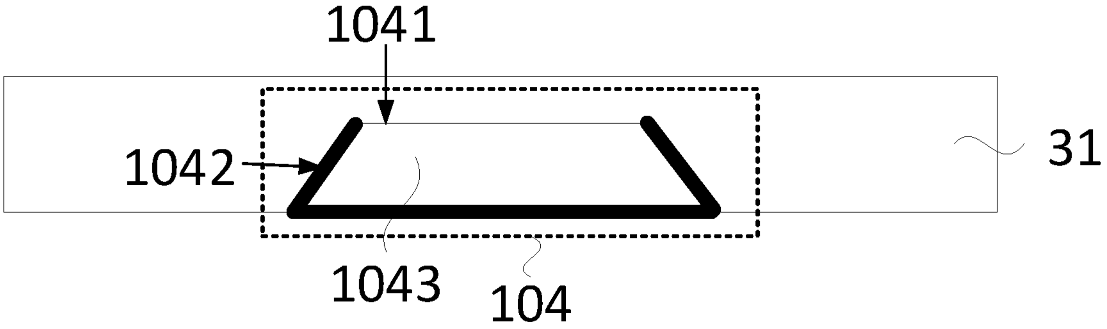
FIG. 9 is an enlarged structure diagram of area F of FIG. 8.

Further, FIG. 8 is a partial sectional diagram of another phase shifter according to an embodiment of the present disclosure, and FIG. 9 is an enlarged structure diagram of area F of FIG. 8. As shown in FIGS. 8 and 9, in an embodiment, the light guiding structure 104 includes a groove 1043, and the groove 1043 may be located on a side of the first substrate 31 facing away from the ground electrode 103.

The groove 1043 is disposed on a side of the first substrate 31 facing away from the ground electrode 103 so that the light guiding structure 104 is formed, and compared with the light guiding structure 104 provided additionally, it is conducive to reducing the thickness of the phase shifter and thus achieving a miniaturized phase shifter.

Further, with continued reference to FIGS. 8 and 9, the light guiding structure 104 further includes the opaque material 1042 covering the groove 1043. When light is transmitted in the light guiding structure 104, the opaque material 1042 confines the light in the groove 1043 so that light leakage and a large amount of light loss during the transmission of the light in the light guiding structure 104 are avoided; the opaque material 1042 is removed at the light output opening 1041 of the light guiding structure 104 so that the light is output from the light output opening 1041.

It is to be noted that the opaque material 1042 may be an opaque material such as organic photoresist, metal, opaque resin, graphite, or other reflective layers, and the opaque material 1042 may also be a material that only blocks the light to which the photo-dielectric layer 102 is able to respond. The so-called light to which the photo-dielectric layer 102 is able to respond may satisfy the following condition: in the case where the light is irradiated to the photo-dielectric layer 102, the dielectric constant of the photo-dielectric layer 102 is changed. For example, the light to which the photo-dielectric layer 102 is able to respond is blue light, and the opaque material 1042 blocks blue light.

Further, it is to be noted that the light guiding structure 104 may also be located on a side of the first substrate 31 facing the ground electrode 103. Embodiments of the present disclosure are merely illustrative and are not intended to limit the present disclosure.

Figure 10:
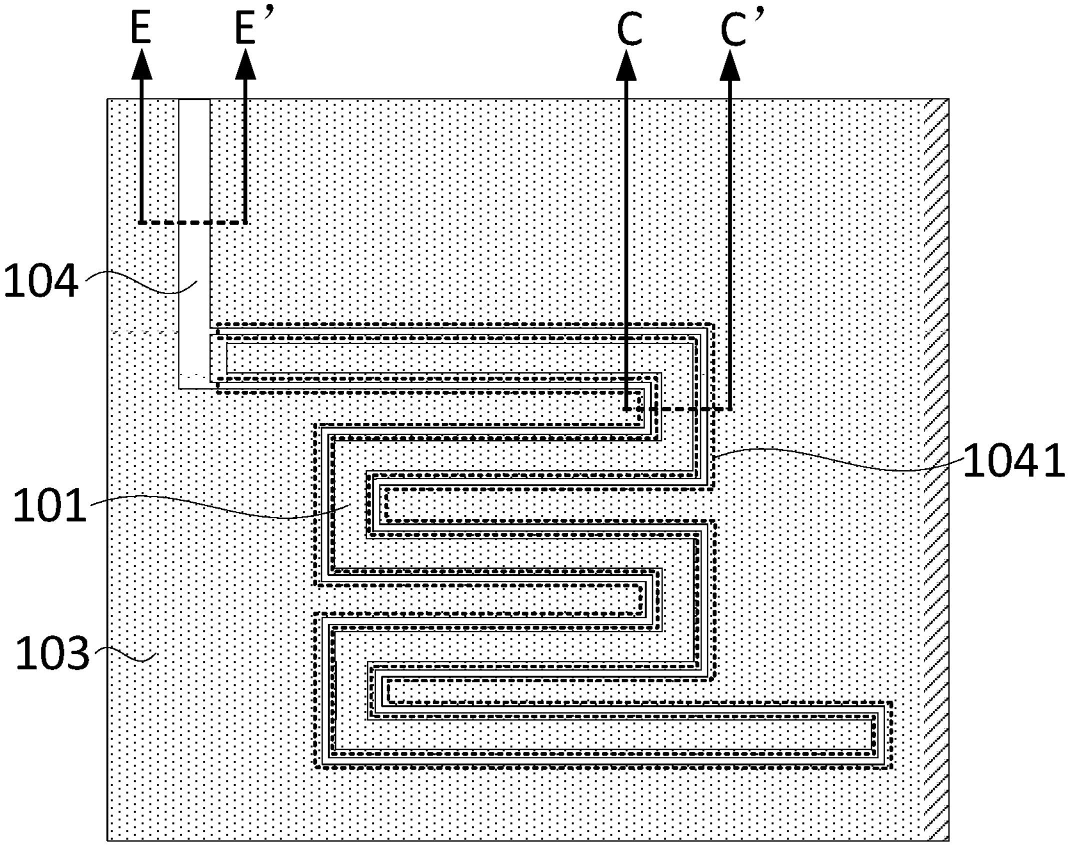
FIG. 10 is a structure diagram of another phase shifter according to an embodiment of the present disclosure.
Figure 11:
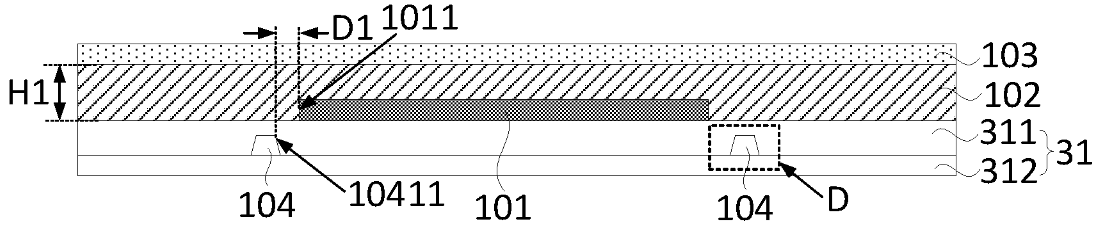
FIG. 11 is a sectional diagram of FIG. 10 taken along the C-C' direction.
Figure 12:
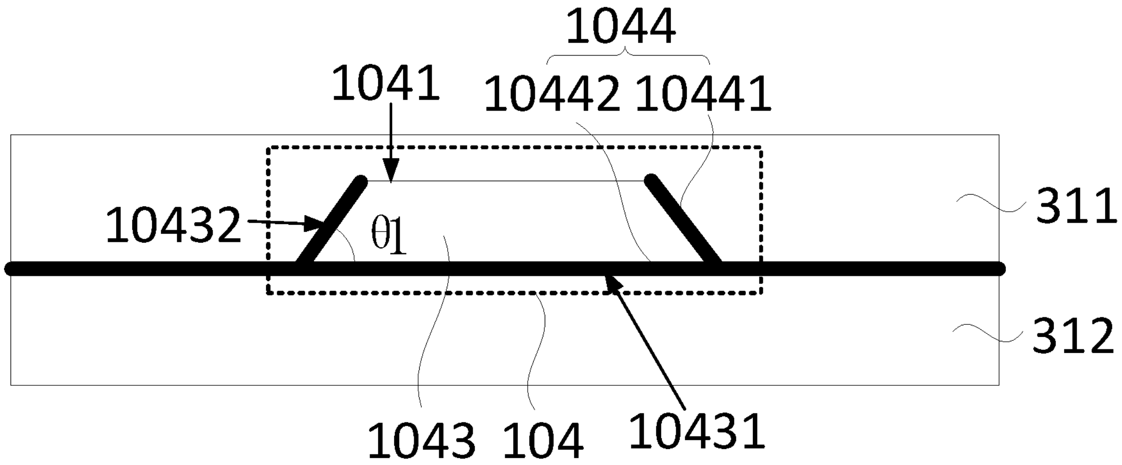
FIG. 12 is an enlarged structure diagram of area D of FIG. 11.
Figure 13:
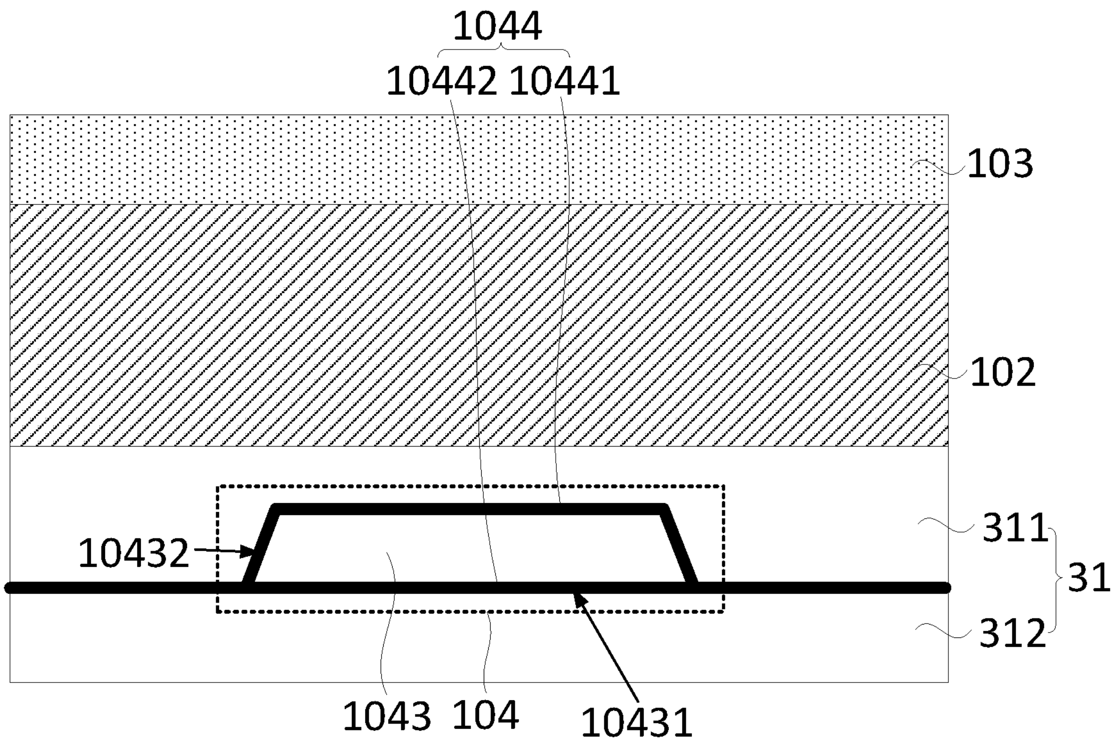
FIG. 13 is a sectional diagram of FIG. 10 taken along the E-E' direction.

FIG. 10 is a structure diagram of another phase shifter according to an embodiment of the present disclosure, FIG. 11 is a sectional diagram of FIG. 10 taken along the C-C' direction, FIG. 12 is an enlarged structure diagram of area D of FIG. 11, and FIG. 13 is a sectional diagram of FIG. 10 taken along the E-E' direction. As shown in FIGS. 10 to 13, in an embodiment, the light guiding structure 104 includes the light output opening 1041; the phase shifter provided in embodiments of the present disclosure further includes the first substrate 31, and the first substrate 31 is located on a side of the microstrip line 101 facing away from the ground electrode 103; the first substrate 31 includes a first sub-substrate 311 and a second sub-substrate 312, and the second sub-substrate 312 is located on a side of the first sub-substrate 311 facing away from the ground electrode 103; the light guiding structure 104 includes the groove 1043 and a metal reflective layer 1044, the groove 1043 is located on a side of the first sub-substrate 311 facing away from the ground electrode 103, and/or the groove 1043 is located a side of the second sub-substrate 312 facing the ground electrode 103; the metal reflective layer 1044 covers the surface of the groove 1043; the light output opening 1041 is disposed on the metal reflective layer 1044 on a side of the groove 1043 facing the photo-dielectric layer 102.

As shown in FIGS. 10 to 13, the first substrate 31 is located on a side of the microstrip line 101 facing away from the ground electrode 103. The light guiding structure 104 is disposed in the first substrate 31 so that the light guiding structure 104 is located on a side of the microstrip line 101 facing away from the ground electrode 103. In this manner, the light guiding structure 104 is prevented from affecting the thickness of the photo-dielectric layer 102, and the accuracy of the phase shift of the photo-dielectric layer 102 is improved. Moreover, the light guiding structure 104 is disposed in the first substrate 31, and compared with the light guiding structure 104 disposed in the photo-dielectric layer 102, the light guiding structure 104 is separated from the microstrip line 101 by one layer of substrate so that the influence of the metal reflective layer 1044 in the light guiding structure 104 on the microstrip line 101 is reduced, good control of the radio frequency signals by the microstrip line 101 is achieved. Further, if the light guiding structure 104 is disposed on a side of the ground electrode 103 facing away from the microstrip line 101, a hollow structure needs to be provided on the ground electrode 103 so that the ground electrode 103 is prevented from blocking the light introduced by the light guiding structure 104. Therefore, in embodiments of the present disclosure, the light guiding structure 104 is disposed on a side of the microstrip line 101 facing away from the ground electrode 103, and a hollow structure does not need to be provided on the ground electrode 103 so that the influence of the hollow structure on the ground electrode 103 on the radio frequency signals is avoided, and good control of the radio frequency signals by the microstrip line 101 is achieved.

Specifically, as shown in FIGS. 10 to 13, the first substrate 31 includes the first sub-substrate 311 and the second sub-substrate 312 located on a side of the first sub-substrate 311 facing away from the ground electrode 103; a side of the first sub-substrate 311 facing away from the ground electrode 103 is provided with the groove 1043, and/or a side of the second sub-substrate 312 facing the ground electrode 103 is provided with the groove 1043; and the metal reflective layer 1044 covers the surface of the groove 1043 so that the light guiding structure 104 is formed. The metal reflective layer 1044 reflects the light in the light guiding structure 104 so that light leakage and a large amount of light loss during the transmission of the light in the light guiding structure 104 are avoided; the metal reflective layer 1044 on a side of the groove 1043 facing the photo-dielectric layer 102 is provided with a hollow structure so that the light output opening 1041 is formed, the light is output from the light output opening 1041, it is ensured that the light is guided into the photo-dielectric layer 102 between the microstrip line 101 and the ground electrode 103, and thus the dielectric constant of the photo-dielectric layer 102 is changed, and the phase shift control of the radio frequency signals transmitted on the microstrip line 101 is achieved.

With continued reference to FIGS. 10 to 13, the light guiding structure 104 at least partially overlaps the photo-dielectric layer 102 so that the light guiding structure 104 is configured to guide light into the photo-dielectric layer 102. In this manner, the dielectric constant of the photo-dielectric layer 102 is changed, and thus the phase shift control of the radio frequency signals transmitted on the microstrip line 101 is achieved. It is to be understood that the light guiding structure 104 may partially overlap the photo-dielectric layer 102, or the vertical projection of the light guiding structure 104 in the plane where the photo-dielectric layer 102 is located is within the photo-dielectric layer 102; further, it is feasible that along the thickness direction of the photo-dielectric layer 102, the photo-dielectric layer 102 overlaps the light guiding structure 104. Those skilled in the art can set the position of the light guiding structure 104 according to the actual requirements as long as the light may be guided into the photo-dielectric layer 102.

With continued reference to FIGS. 10 to 13, in an embodiment, the light guiding structure 104 is located on a side of the microstrip line 101 facing away from the ground electrode 103, and/or the light guiding structure 104 is located on a side of the ground electrode 103 facing away from the microstrip line 101.

The light guiding structure 104 may be located on aside of the microstrip line 101 facing away from the ground electrode 103, or the light guiding structure 104 may be located on a side of the ground electrode 103 facing away from the microstrip line 101, or a side of the microstrip line 101 facing away from the ground electrode 103 and a side of the ground electrode 103 facing away from the microstrip line 101 are both provided with the light guiding structure 104 so that light is guided into the photo-dielectric layer 102, and thus the dielectric constant of the photo-dielectric layer 102 is controlled to change by the light, and the phase shift control of the radio frequency signals transmitted on the microstrip line 101 is achieved, which can be set flexibly by those skilled in the art according to the actual requirements.

With continued reference to FIGS. 10 to 13, in an embodiment, the light guiding structure 104 includes the light output opening 1041, and the vertical projection of the light output opening 1041 on the plane where the microstrip line 101 is located does not overlap the microstrip line 101.

In an embodiment, as shown in FIGS. 10 to 13, the case where the light guiding structure 104 is located on a side of the microstrip line 101 facing away from the ground electrode 103 is used as an example. The light guiding structure 104 includes the light output opening 1041, and light may be output only from the light output opening 1041 so that light leakage and a large amount of light loss during the transmission of the light in the light guiding structure 104 are avoided.

With continued reference to FIG. 11, in an embodiment, along the direction parallel to the plane where the photo-dielectric layer 102 is located, the light output opening 1041 includes the first boundary 10411, and the first boundary 10411 is a boundary of a side of the light output opening 1041 facing the microstrip line 101; the microstrip line 101 includes the second boundary 1011, and the second boundary 1011 is a boundary of a side of the microstrip line 101 facing the light output opening 1041. The shortest distance between the first boundary 10411 and the second boundary 1011 is D1, where $0<D1\leq 2$ mm.

As shown in FIG. 11, if the shortest distance D1 between the first boundary 10411 and the second boundary 1011 is too great, the distance between the light output opening 1041 and the photo-dielectric layer 102 between the microstrip line 101 and the ground electrode 103 is relatively great so that when propagating to the photo-dielectric layer 102 between the microstrip line 101 and the ground electrode 103, the light output from the light output opening 1041 is attenuated greatly, and thus the light utilization efficiency is reduced. In embodiments of the present disclosure, the shortest distance D1 between the first boundary 10411 of the light output opening 1041 and the second boundary 1011 of the microstrip line 101 satisfies $0<D1\leq 2$ mm so that the light output opening 1041 is relatively facing the photo-dielectric layer 102 between the microstrip line 101 and the ground electrode 103, which is conducive to improving the light utilization efficiency.

With continued reference to FIGS. 10 to 13, in an embodiment, the groove 1043 is located on a side of the first sub-substrate 311 facing away from the ground electrode 103; the groove 1043 includes a first top surface 10431 and a first sidewall 10432, and the first top surface 10431 is located on a side of the groove 1043 facing the second sub-substrate 312; the metal reflective layer 1044 includes a first metal reflective layer 10441 and a second metal reflective layer 10442, the first metal reflective layer 10441 covers the first sidewall 10432, and the second metal reflective layer 10442 covers the first top surface 10431; the light output opening 1041 is disposed on the first metal reflective layer 10442.

Specifically, as shown in FIGS. 10 to 13, in the case where the groove 1043 is located on a side of the first sub-substrate 311 facing away from the ground electrode 103 is used as an example. When the light guiding structure 104 is prepared, a side of the first sub-substrate 311 facing away from the ground electrode 103 is provided with the groove 1043, and the groove 1043 includes the first top surface 10431 and the first sidewall 10432; the first metal reflective layer 10441 is formed on a side of the groove 1043, the first metal reflective layer 10441 covers the first sidewall 10432, and the first metal reflective layer 10441 is etched so that the light output opening 1041 is formed and the light may be output from the light output opening 1041; the second metal reflective layer 10442 is disposed on a side of the second sub-substrate 312, and the first sub-substrate 311 and the second sub-substrate 312 are bonded so that the second metal reflective layer 10442 covers the first top surface 10431 and the light guiding structure 104 is formed in the first substrate 31. The first substrate 31 includes the first sub-substrate 311 and the second sub-substrate 312, and the light guiding structure 104 is formed between the first sub-substrate 311 and the second sub-substrate 312 so that the manufacturing difficulty of the light guiding structure 104 is reduced.

With continued reference to FIGS. 10 to 13, in an embodiment, the groove 1043 is located on a side of the first sub-substrate 311 facing away from the ground electrode 103, the first sub-substrate 311 is a flexible substrate, and the groove 1043 is formed by an imprinting process.

Specifically, as shown in FIGS. 10 to 13, in the case where the groove 1043 is located on a side of the first sub-substrate 311 facing away from the ground electrode 103 is used as an example, and the first sub-substrate 311 may be set as a flexible substrate so that the groove 1043 may be formed by an imprinting process. For example, the groove 1043 is formed on the first sub-substrate 311 by a nano-imprinting process, and compared with the related art, no etching process is needed so that the processing difficulty is reduced.

In an embodiment, the material of the flexible substrate includes polyimide (PI), liquid crystal polymer (LCP), and metal so that the first sub-substrate 311 has the characteristics of low cost and good flexibility. For example, an aluminum thin film is used as a flexible substrate, and those skilled in the art can set the material of the first sub-substrate 311 according to the actual requirements, which is not limited in embodiments of the present disclosure.

With continued reference to FIG. 12, in an embodiment, the included angle between the first top surface 10431 and the first sidewall 10432 is θ1, where 0<θ1<90°.

As shown in FIG. 12, the included angle θ1 between the first top surface 10431 and the first sidewall 10432 satisfies 0<θ1<90°, that is, the first sidewall 10432 is a sloped surface. In this manner, in the case where the first metal reflective layer 10441 is formed on a side of the groove 1043, the first metal reflective layer 10441 may easily cover the first sidewall 10432 so that the uniformity of the deposition of the first metal reflective layer 10441 on the first sidewall 10432 is improved, and the light leakage on the first sidewall 10432 is solved.

Figure 14:
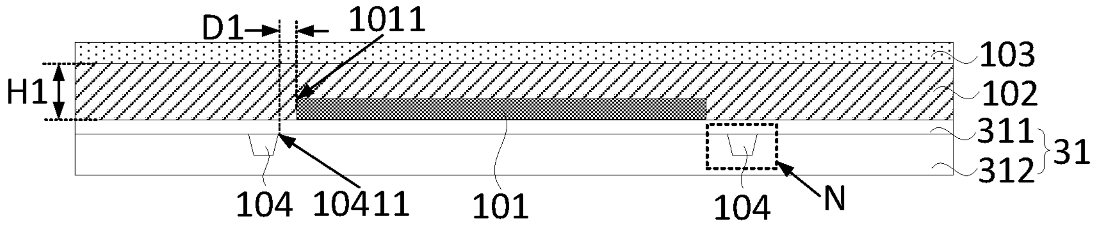
FIG. 14 is a partial sectional diagram of another phase shifter according to an embodiment of the present disclosure.
Figure 15:
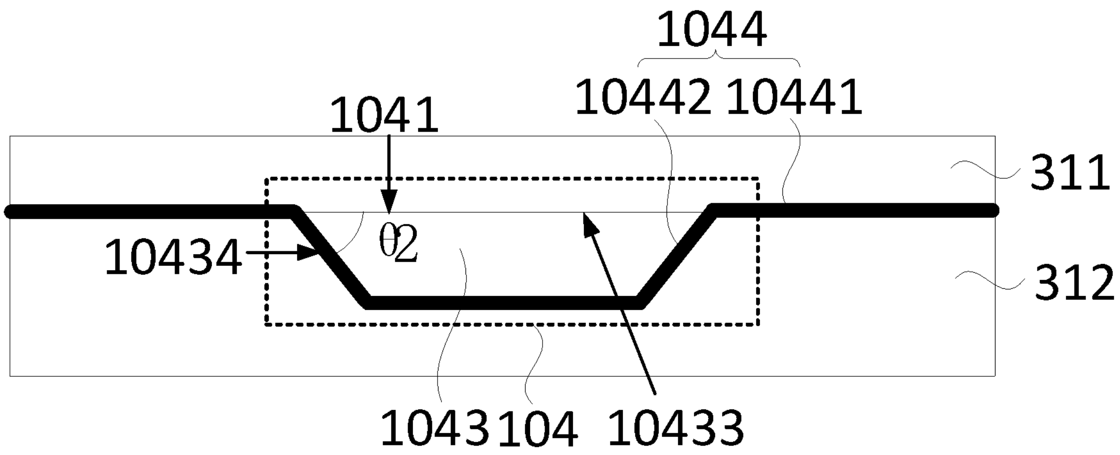
FIG. 15 is an enlarged structure diagram of area N of FIG. 14.

FIG. 14 is a partial sectional diagram of another phase shifter according to an embodiment of the present disclosure, and FIG. 15 is an enlarged structure diagram of area N of FIG. 14. As shown in FIGS. 10, 14, and 15, in an embodiment, the groove 1043 is located on a side of the second sub-substrate 312 facing the ground electrode 103; the groove 1043 includes a second top surface 10433 and a second sidewall 10434, and the second top surface 10433 is located on a side of the groove 1043 facing the first sub-substrate 311; the metal reflective layer 1044 includes the first metal reflective layer 10441 and the second metal reflective layer 10442, the first metal reflective layer 10441 covers the second top surface 10433, and the second metal reflective layer 10442 covers the second sidewall 10434; the light output opening 1041 is disposed on the first metal reflective layer 10441.

Specifically, as shown in FIGS. 14 and 15, in the case where the groove 1043 is located on a side of the second sub-substrate 312 facing the ground electrode 103 is used as an example. When the light guiding structure 104 is prepared, the groove 1043 is prepared on a side of the second sub-substrate 312, the groove 1043 includes the second top surface 10433 and the second sidewall 10434, the second metal reflective layer 10442 is prepared on a side of the groove 1043, and the second metal reflective layer 10442 covers the second sidewall 10434; the first metal reflective layer 10441 is provided on a side of the first substrate 311, and the first metal reflective layer 10441 is etched so that the light output opening 1041 is formed, and the light may be output from the light output opening 1041. The first sub-substrate 311 and the second sub-substrate 312 are bonded so that the first metal reflective layer 10441 covers the second top surface 10433, and thus the light guiding structure 104 is formed in the first substrate 31. When the first metal reflective layer 10441 is etched, since no groove 1043 is provided on the first sub-substrate 311, the first metal reflective layer 10441 is located in the same plane so that the etching process can be implemented easily, which is conducive to improving the etching accuracy. Moreover, the first substrate 31 includes the first sub-substrate 311 and the second sub-substrate 312, and the light guiding structure 104 is formed between the first sub-substrate 311 and the second sub-substrate 312 so that the manufacturing difficulty of the light guiding structure 104 is reduced. Further, the groove 1043 is disposed on the second sub-substrate 312, and structures such as the microstrip line 101 are provided on the first sub-substrate 311 so that electrode layers and the grooves 1043 are prevented from being made on the same substrate. Structures such as the groove 1043 and the microstrip line 101 are formed on different sub-substrates, and then the different sub-substrates are bonded together so that the preparation process is simplified and the following case can be avoided: the prepared groove 1043 affects the microstrip line 101 and thus affects the phase shift function of the phase shifter.

With continued reference to FIGS. 14 and 15, in an embodiment, the groove 1043 is located on a side of the second sub-substrate 312 facing the ground electrode 103, the second sub-substrate 312 is a flexible substrate, and the groove 1043 is formed by an imprinting process.

Specifically, as shown in FIGS. 14 and 15, the case where the groove 1043 is located on a side of the first sub-substrate 311 facing the ground electrode 103 is used as an example, and the second sub-substrate 312 may be set as a flexible substrate so that the groove 1043 may be formed by an imprinting process. For example, the groove 1043 is formed on the second sub-substrate 312 by a nano-imprinting process, and compared with the related art, no etching process is needed so that the processing difficulty is reduced.

In an embodiment, the material of the flexible substrate includes polyimide (PI), liquid crystal polymer (LCP), and metal so that the second sub-substrate 312 has the characteristics of low cost and good flexibility. For example, an aluminum thin film is used as a flexible substrate, and those skilled in the art can set the material of the second sub-substrate 312 according to the actual requirements, which is not limited in embodiments of the present disclosure.

With continued reference to FIG. 15, in an embodiment, the included angle between the second top surface 10433 and the second sidewall 10434 is θ2, where 0<θ2<90°.

As shown in FIG. 15, the included angle θ2 between the second top surface 10433 and the second sidewall 10434 satisfies 0<θ2<90°, that is, the second sidewall 10434 is a sloped surface. In this manner, in the case where the second metal reflective layer 10442 is formed on a side of the groove 1043, the second metal reflective layer 10442 may easily cover the second sidewall 10434 so that the uniformity of the deposition of the second metal reflective layer 10442 on the second sidewall 10434 is improved, and the light leakage on the second sidewall 10434 is solved.

Figure 16:
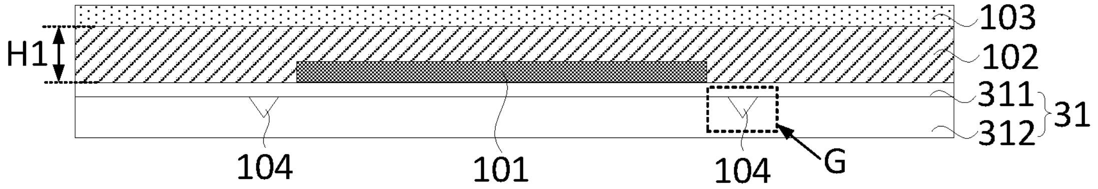
FIG. 16 is a partial sectional diagram of another phase shifter according to an embodiment of the present disclosure.
Figure 17:
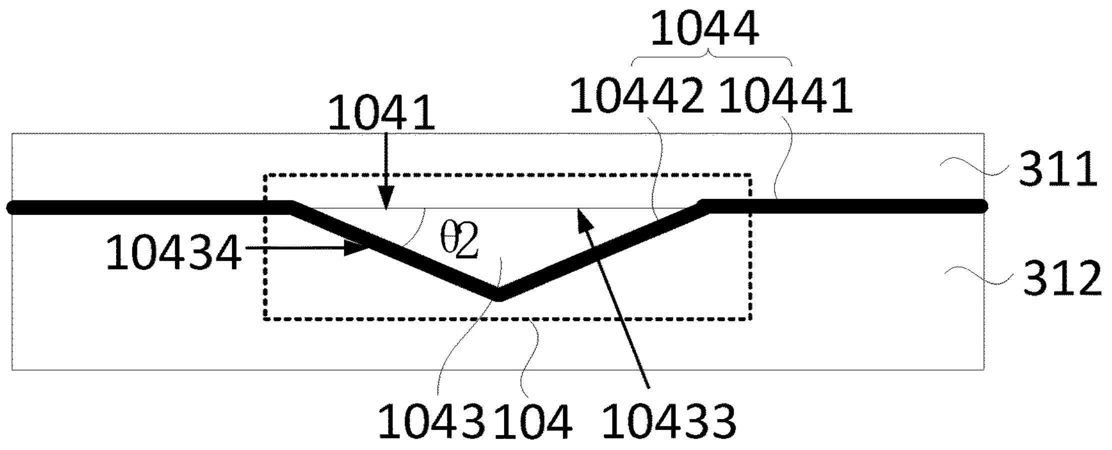
FIG. 17 is an enlarged structure diagram of area G of FIG. 16.

It is to be noted that the shape of the groove 1043 may be set arbitrarily according to the actual requirements. In an embodiment, as shown in FIGS. 11 to 15, the section of the groove 1043 may be trapezoidal. FIG. 16 is a partial sectional diagram of another phase shifter according to an embodiment of the present disclosure, and FIG. 17 is an enlarged structure diagram of area G of FIG. 16. In an embodiment, as shown in FIGS. 16 and 17, the section of the groove 1043 may also be triangular. In other embodiments, the section of the groove 1043 may also be rectangular, which is not limited in embodiments of the present disclosure.

With continued reference to FIGS. 14 to 15, in an embodiment, the light guiding structure 104 at least partially overlaps the photo-dielectric layer 102, and the light guiding structure 104 is configured to guide light into the photo-dielectric layer 102 so that the dielectric constant of the photo-dielectric layer 102 is changed, and thus the phase shift control of the radio frequency signals transmitted on the microstrip line 101 is achieved. It is to be understood that the light guiding structure 104 may partially overlap the photo-dielectric layer 102, or the vertical projection of the light guiding structure 104 in the plane where the photo-dielectric layer 102 is located is within the photo-dielectric layer 102; further, it is feasible that along the thickness direction of the photo-dielectric layer 102, the photo-dielectric layer 102 overlaps the light guiding structure 104. Those skilled in the art can set the position of the light guiding structure 104 according to the actual requirements as long as the light may be guided into the photo-dielectric layer 102.

With continued reference to FIGS. 14 to 15, in an embodiment, the light guiding structure 104 is located on a side of the microstrip line 101 facing away from the ground electrode 103, and/or the light guiding structure 104 is located on a side of the ground electrode 103 facing away from the microstrip line 101.

The light guiding structure 104 may be located on aside of the microstrip line 101 facing away from the ground electrode 103, or the light guiding structure 104 may be located on a side of the ground electrode 103 facing away from the microstrip line 101, or a side of the microstrip line 101 facing away from the ground electrode 103 and a side of the ground electrode 103 facing away from the microstrip line 101 are both provided with the light guiding structure 104 so that light is guided into the photo-dielectric layer 102, and thus the dielectric constant of the photo-dielectric layer 102 is controlled to change by the light, and the phase shift control of the radio frequency signals transmitted on the microstrip line 101 is achieved, which can be set flexibly by those skilled in the art according to the actual requirements.

With continued reference to FIGS. 14 to 15, in an embodiment, the light guiding structure 104 includes the light output opening 1041, and the vertical projection of the light output opening 1041 on the plane where the microstrip line 101 is located does not overlap the microstrip line 101.

In an embodiment, as shown in FIGS. 14 to 15, in the case where the light guiding structure 104 is located on a side of the microstrip line 101 facing away from the ground electrode 103 is used as an example. The light guiding structure 104 includes the light output opening 1041, and light may be output only from the light output opening 1041 so that light leakage and a large amount of light loss during the transmission of the light in the light guiding structure 104 are avoided.

With continued reference to FIG. 14, in an embodiment, along the direction parallel to the plane where the photo-dielectric layer 102 is located, the light output opening 1041 includes the first boundary 10411, and the first boundary 10411 is a boundary of a side of the light output opening 1041 facing the microstrip line 101; the microstrip line 101 includes the second boundary 1011, and the second boundary 1011 is a boundary of a side of the microstrip line 101 facing the light output opening 1041. The shortest distance between the first boundary 10411 and the second boundary 1011 is D1, where $0<D1\leq 2$ mm.

As shown in FIG. 14, if the shortest distance D1 between the first boundary 10411 and the second boundary 1011 is too great, the distance between the light output opening 1041 and the photo-dielectric layer 102 between the microstrip line 101 and the ground electrode 103 is relatively great so that when propagating the light to the photo-dielectric layer 102 between the microstrip line 101 and the ground electrode 103, the light output from the light output opening 1041 is attenuated greatly, and thus the light utilization efficiency is reduced. In embodiments of the present disclosure, the shortest distance D1 between the first boundary 10411 of the light output opening 1041 and the second boundary 1011 of the microstrip line 101 satisfies $0<D1\leq 2$ mm so that the light output opening 1041 is relatively facing the photo-dielectric layer 102 between the microstrip line 101 and the ground electrode 103, which is conducive to improving the light utilization efficiency.

Figure 18:
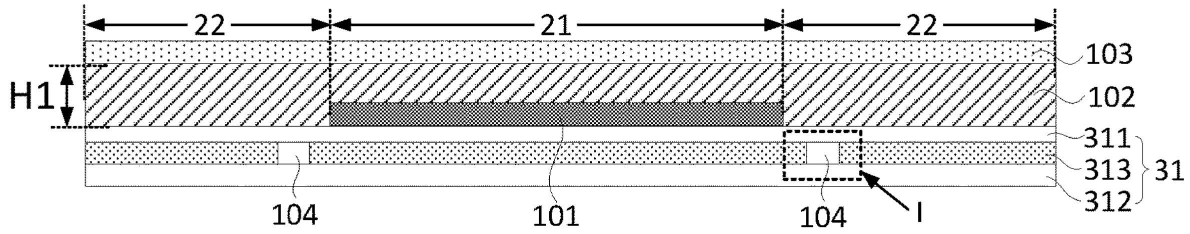
FIG. 18 is a partial sectional diagram of another phase shifter according to an embodiment of the present disclosure.
Figure 19:
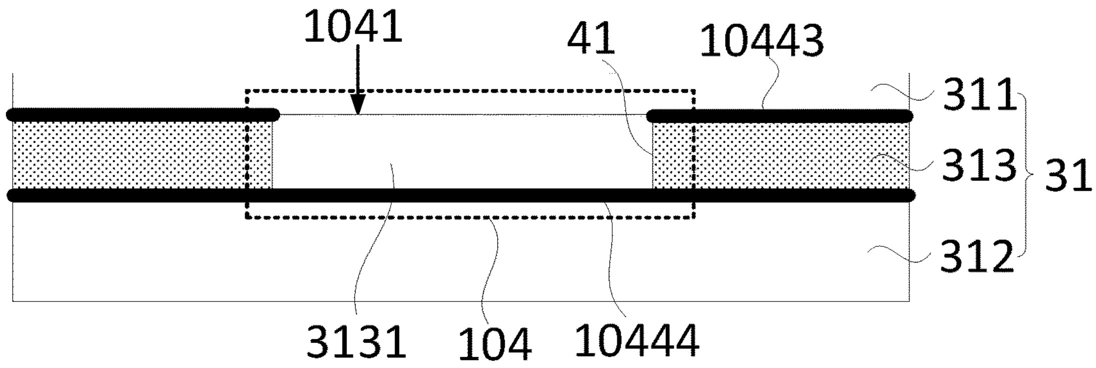
FIG. 19 is an enlarged structure diagram of area I of FIG. 18.

FIG. 18 is a partial sectional diagram of another phase shifter according to an embodiment of the present disclosure, and FIG. 19 is an enlarged structure diagram of area I of FIG. 18. As shown in FIGS. 18 and 19, in an embodiment, the light guiding structure 104 includes the light output opening 1041. The phase shifter provided in embodiments of the present disclosure further includes the first substrate 31, and the first substrate 31 is located on a side of the microstrip line 101 facing away from the ground electrode 103. The first substrate 31 includes a first sub-substrate 311, a second sub-substrate 312, and a third sub-substrate 313. The third sub-substrate 313 is located on a side of the first sub-substrate 311 facing away from the ground electrode 103, and the second sub-substrate 312 is located on a side of the third sub-substrate 313 facing away from the first sub-substrate 311. The third sub-substrate 313 includes a first hollow portion 3131, a third metal reflective layer 10443 is disposed on a side of the first hollow portion 3131 facing the first sub-substrate 311, a fourth metal reflective layer 10444 is disposed on a side of the first hollow portion 3131 facing the second sub-substrate 312, and the light output opening 1041 is disposed on the third metal reflective layer 10443.

Specifically, as shown in FIGS. 18 and 19, the first substrate 31 includes the first sub-substrate 311, the second sub-substrate 312, and the third sub-substrate 313. When the light guiding structure 104 is prepared, the fourth metal reflective layer 10444 is prepared on the second sub-substrate 312, the third sub-substrate 313 is disposed on a side of the fourth metal reflective layer 10444 facing away from the second sub-substrate 312, and the third sub-substrate 313 is etched so that the first hollow portion 3131 is formed. The third metal reflective layer 10443 is prepared on a side of the first sub-substrate 311, and the third metal reflective layer 10443 is etched so that the light output opening 1041 is formed. The first sub-substrate 311 and the third sub-substrate 313 are bonded together so that the third metal reflective layer 10443 is bonded to the third sub-substrate 313, and the light guiding structure 104 is formed in the first substrate 31. In this embodiment, a groove structure does not need to be provided on the first sub-substrate 311. Therefore, when the third metal reflective layer 10443 is etched to form the light output opening 1041, since the first sub-substrate 311 is not provided the groove structure, the first metal reflective layer 10441 disposed on the first sub-substrate 311 is a plane, and compared with the solution in which the first sub-substrate 311 is provided with the groove 1043, a planar etching process can be implemented easily, which is conducive to improving the etching accuracy. Moreover, the first substrate 31 includes the first sub-substrate 311, the second sub-substrate 312, and the third sub-substrate 313, and the light guiding structure 104 is formed on the third sub-substrate 313 between the first sub-substrate 311 and the second sub-substrate 312 so that the manufacturing difficulty of the light guiding structure 104 is reduced.

Figure 20:
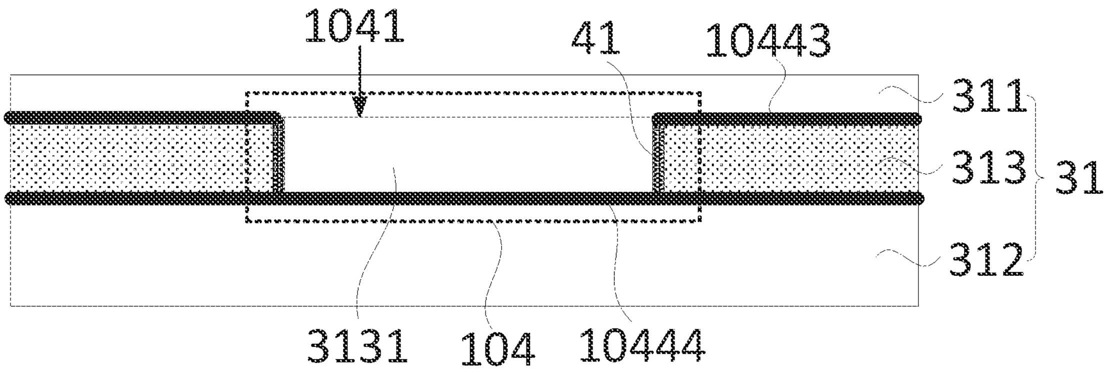
FIG. 20 is a partial sectional diagram of another phase shifter according to an embodiment of the present disclosure.

Based on the preceding embodiments, FIG. 20 is a partial sectional diagram of another phase shifter according to an embodiment of the present disclosure. As shown in FIG. 20, in an embodiment, a light blocking layer 41 is provided on the sidewall of the first hollow portion 3131.

Specifically, as shown in FIG. 20, the light blocking layer 41 is provided on the sidewall of the first hollow portion 3131. In this manner, light does not leak from the sidewall of the first hollow portion 3131 during the transmission of the light in the light guiding structure 104 so that a large amount of light loss is avoided, which is conducive to improving the light utilization efficiency. The material of the light blocking layer 41 may include metal or light blocking pigments. In the case where the light blocking layer 41 is provided on the sidewall of the first hollow portion 3131, the third sub-substrate 313 may be made of a transparent material so that the material of the third sub-substrate 313 has more choices. For example, the third sub-substrate 313 is made of optical clear (OC), and the sidewall of the first hollow portion 3131 is coated with a black pigment, which can be set by those skilled in the art according to the actual requirements and is not limited in embodiments of the present disclosure.

With continued reference to FIG. 19, in an embodiment, the material of the third sub-substrate 313 is an opaque material.

Specifically, as shown in FIG. 19, the material of the third sub-substrate 313 is set as an opaque material. In this manner, light does not leak from the sidewall of the first hollow portion 3131 during the transmission of the light in the light guiding structure 104 so that a large amount of light loss is avoided, which is conducive to improving the light utilization efficiency. In this solution, the light blocking layer 41 does not need to be provided on the sidewall of the first hollow portion 3131 so that the preparation process is simplified and the preparation difficulty is reduced. The third sub-substrate 313 may be any opaque material such as organic photoresist, metal, opaque resin, and graphite, which is not limited in embodiments of the present disclosure.

It is to be noted that the opaque material may be black material, and the opaque material may also be a material that only blocks the light to which the photo-dielectric layer 102 is able to respond. The so-called "light" to which the photo-dielectric layer 102 is able to respond may satisfy the following condition: in the case where the light is irradiated to the photo-dielectric layer 102, the dielectric constant of the photo-dielectric layer 102 is changed. For example, the light to which the photo-dielectric layer 102 is able to respond is blue light, and the opaque material blocks blue light.

Based on the preceding embodiments, with continued reference to FIGS. 2, 10, and 14, in an embodiment, the vertical projection of the light guiding structure 104 on the plane where the microstrip line 101 is located does not overlap the microstrip line 101.

Specifically, as shown in FIGS. 2, 10 and 14, the vertical projection of the light guiding structure 104 on the plane where the microstrip line 101 is located does not overlap the microstrip line 101. It is to be understood that in the case where the vertical projection of the light guiding structure 104 on the plane where the microstrip line 101 is located does not overlap the microstrip line 101 indicates that along the thickness direction of the microstrip line 101, no overlapping area between the light guiding structure 104 and the microstrip line 101 exists. The vertical projection of the light guiding structure 104 on the plane where the microstrip line 101 is located does not overlap the microstrip line 101 so that while the light output from the light guiding structure 104 can be prevented from being blocked by the microstrip line 101, and the influence of the light guiding structure 104 on the radio frequency signals transmitted in the photo-dielectric layer 102 can be reduced.

In an embodiment, as shown in FIGS. 2 to 4, in the case where the light guiding structure 104 is located on a side of the microstrip line 101 facing the ground electrode 103 is used as an example, and the vertical projection of the light guiding structure 104 on the plane where the microstrip line 101 is located does not overlap the microstrip line 101 so that the light guiding structure 104 does not affect the thickness of the photo-dielectric layer 102 between the microstrip line 101 and the ground electrode 103. In this manner, the influence of the light guiding structure 104 on the radio frequency signals transmitted on the microstrip line 101 can be reduced, and thus the accuracy of the phase shift of the photo-dielectric layer 102 for the radio frequency signals can be ensured.

In other embodiments, as shown in FIGS. 10 to 17, in the case where the light guiding structure 104 is located on a side of the microstrip line 101 facing away from the ground electrode 103 is used as an example, the light guiding structure 104 includes the groove 1043 and the metal reflective layer 1044 covering the groove 1043, and the vertical projection of the light guiding structure 104 on the plane where the microstrip line 101 is located does not overlap the microstrip line 101 so that the influence of the metal reflective layer 1044 in the light guiding structure 104 on the microstrip line 101 can be reduced, and thus the influence of the light guiding structure 104 on the radio frequency signals transmitted on the microstrip line 101 can be reduced. At the same time, since the light guiding structure 104 does not overlap the microstrip line 101 along the thickness direction of the microstrip line 101, the light output opening 1041 is provided at any position of the light guiding structure 104, and the light output from the light output opening 1041 is not blocked by the microstrip line 101 so that it can be ensured that light is guided into the photo-dielectric layer 102 between the microstrip line 101 and the ground electrode 103. In this manner, the dielectric constant of the photo-dielectric layer 102 can be changed, and thus the phase shift control of the radio frequency signals transmitted on the microstrip line 101 can be achieved.

It is to be noted that in the case where the vertical projection of the light guiding structure 104 on the plane where the microstrip line 101 is located does not overlap the microstrip line 101 has nothing to do with the film layer structure where the light guiding structure 104 is located. The light guiding structure 104 may be located on a side of the microstrip line 101 facing away from the ground electrode 103, and/or the light guiding structure 104 is located on a side of the microstrip line 101 facing the ground electrode 103. In an embodiment, as shown in FIG. 18, the phase shifter provided in embodiments of the present disclosure includes the microstrip-line arrangement area 21 and the non-microstrip-line arrangement area 22. Along the thickness direction of the microstrip line 101, the microstrip line 101 coincides with the microstrip-line arrangement area 21, that is, along the thickness direction of the microstrip line 101, the edge of the microstrip-line arrangement area 21 coincides with the edge of the microstrip line 101, and the light guiding structure 104 is located in the non-microstrip-line arrangement area 22 so that while the light output from the light guiding structure 104 can be prevented from being blocked by the microstrip line 101, the phase shift performance of the photo-dielectric layer 102 for the radio frequency signals can be ensured.

It is to be noted that the preceding embodiments are only examples. In other embodiments, the vertical projection of the light guiding structure 104 on the plane where the microstrip line 101 is located may overlap the microstrip line 101 (as shown in FIG. 5), which can be set by those skilled in the art according to the actual requirements and is not limited in embodiments of the present disclosure.

Figure 21:
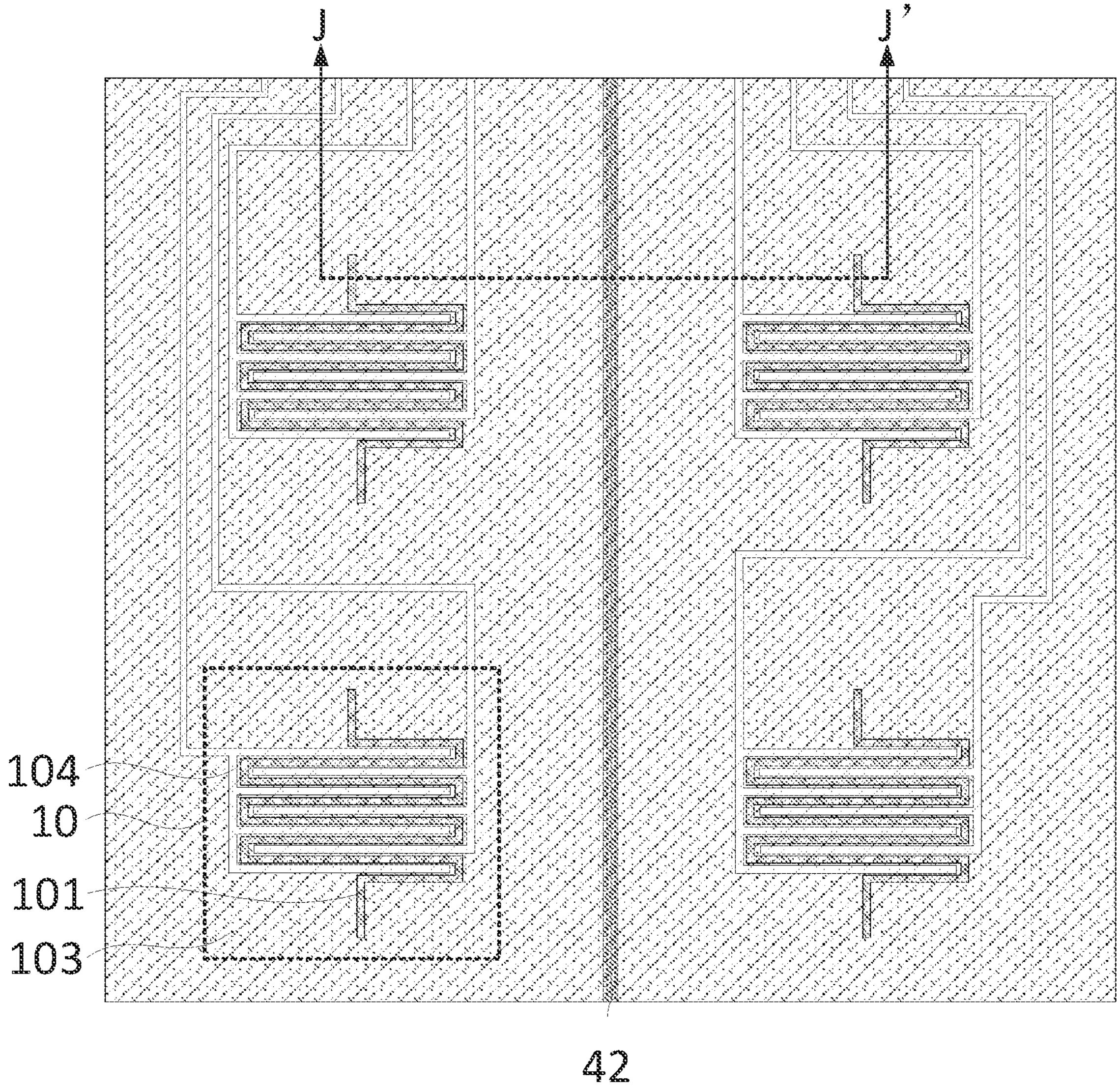
FIG. 21 is a structure diagram of another phase shifter according to an embodiment of the present disclosure.
Figure 22:
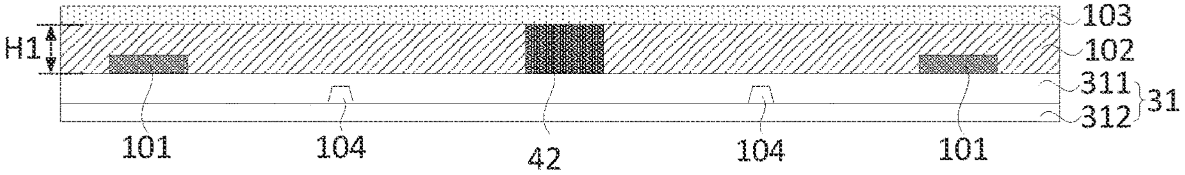
FIG. 22 is a sectional diagram of FIG. 21 taken along the J-J' direction.

Based on the preceding embodiments, FIG. 21 is a structure diagram of another phase shifter according to an embodiment of the present disclosure, and FIG. 22 is a sectional diagram of FIG. 21 taken along the J-J' direction. As shown in FIGS. 21 and 22, in an embodiment, the phase shifter provided in embodiments of the present disclosure further includes a spacing structure 42, the spacing structure 42 is located between the microstrip line 101 and the ground electrode 103, and the spacing structure 42 is located between the phase shifting units 10.

As shown in FIGS. 21 and 22, the dielectric constant of the photo-dielectric layer 102 is changed by the influence of light, and the phases of the radio frequency signals are changed by the influence of the dielectric constant of the photo-dielectric layer 102. Therefore, the phase adjustment can be achieved by controlling the light. In the phase shifter provided in embodiments of the present disclosure, the spacing structure 42 is disposed between the phase shifting units 10, and the spacing structure 42 is configured to block light so that the lights in different phase shifting units 10 can be isolated by the spacing structure 42. In this manner, the crosstalk between the lights in different phase shifting units 10 can be reduced, and thus the accuracy of the phase adjustment can be further improved. Further, as shown in FIGS. 21 and 22, the spacing structure 42 may also play a supporting role between the ground electrode 103 and the first substrate 31 so that the difference in the distances between the ground electrode 103 and the first substrate 31 at all positions of the phase shifter can be reduced, the uniformity of the thickness of the photo-dielectric layer 102 can be improved, and the accuracy of the phase adjustment can be further improved.

It is to be noted that those skilled in the art can arbitrarily set the arrangement position of the spacing structure 42 as long as the mutual influence between the lights in different phase shifting units 10 can be reduced, which is not limited in embodiments of the present disclosure.

In an embodiment, as shown in FIGS. 21 and 22, the spacing structure 42 may be arranged between two different phase shifting units 10 so that the mutual influence between the lights in the two phase shifting units 10 can be reduced, and thus the accuracy of the phase adjustment can be improved. In other embodiments, one spacing structure 42 may also be arranged every one or more phase shifting units 10, which is not limited in embodiments of the present disclosure.

Figure 23:
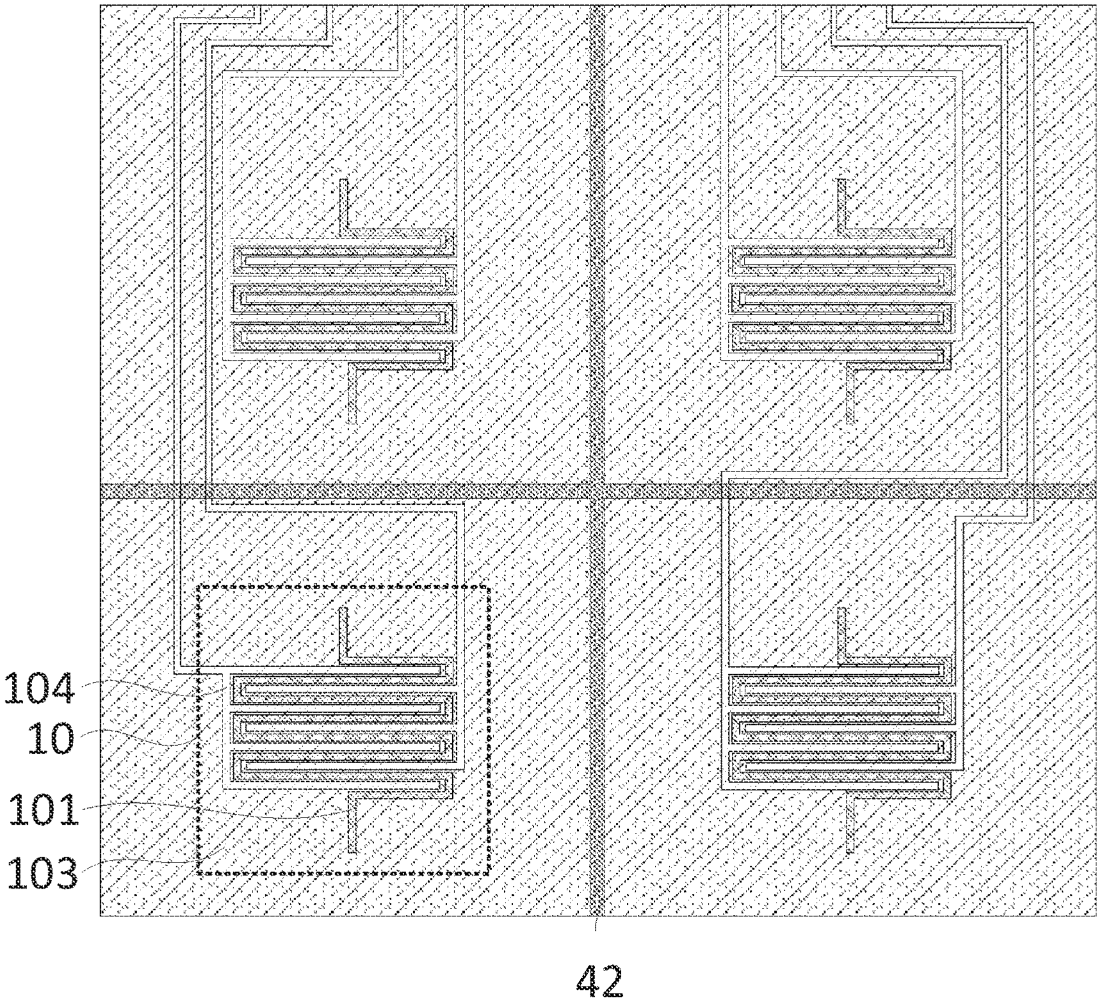
FIG. 23 is a structure diagram of another phase shifter according to an embodiment of the present disclosure.

Based on the preceding embodiment, FIG. 23 is a structure diagram of another phase shifter according to an embodiment of the present disclosure. As shown in FIG. 23, in an embodiment, the distance between adjacent phase shifting units 10 is relatively small, and the mutual influence between the lights in adjacent phase shifting units 10 is relatively great. Therefore, the spacing structure 42 may be arranged between any two adjacent phase shifting units 10 so that the mutual influence between the lights in adjacent phase shifting units 10 can be reduced, and thus the accuracy of the phase adjustment can be further reduced.

Figure 24:
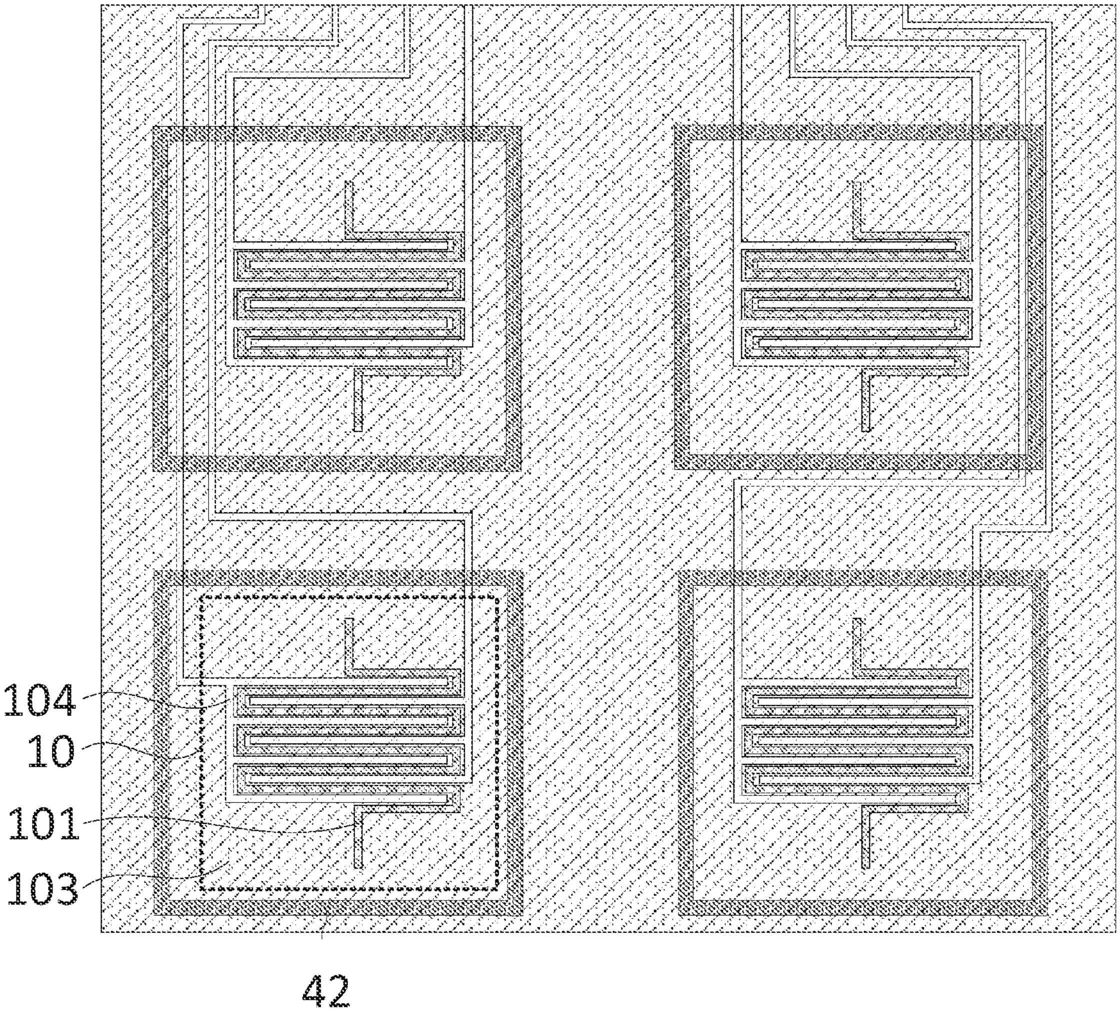
FIG. 24 is a structure diagram of another phase shifter according to an embodiment of the present disclosure.

FIG. 24 is a structure diagram of another phase shifter according to an embodiment of the present disclosure. As shown in FIG. 24, in an embodiment, the spacing structure 42 may also be arranged around the phase shifting unit 10 so that while the mutual influence of the lights in different phase shifting units 10 can be reduced, the interference of external ambient light on the lights in the phase shifting units 10 can be reduced, and thus the accuracy of the phase adjustment can be further improved.

In other embodiments, those skilled in the art can also dispose the spacing structure 42 between the microstrip line 101 and the ground electrode 103 or in any one or more film layers between the light guiding structure 104 and the ground electrode 103 as long as the lights in different phase shifting units 10 may be blocked.

It is to be noted that the spacing structure 42 may be any opaque material, and those skilled in the art can set the material of the spacing structure 42 according to the actual requirements, which is not limited in embodiments of the present disclosure.

Figure 25:
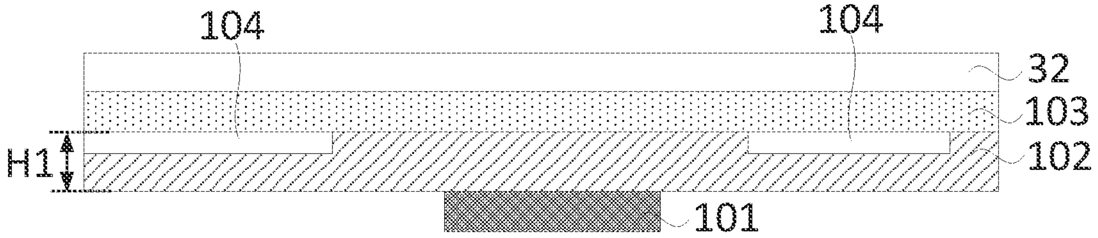
FIG. 25 is a partial sectional diagram of another phase shifter according to an embodiment of the present disclosure.

FIG. 25 is a partial sectional diagram of another phase shifter according to an embodiment of the present disclosure. As shown in FIG. 25, in an embodiment, the phase shifter provided in embodiments of the present disclosure further includes a second substrate 32, and the second substrate 32 is located on a side of the ground electrode 103 facing away from the microstrip line 101.

As shown in FIG. 25, the case where the light guiding structure 104 is located on a side of the microstrip line 101 facing the ground electrode 103 is used as an example, and the second substrate 32 is disposed on a side of the ground electrode 103 facing away from the microstrip line 101 so that the second substrate 32 can support and protect the phase shifter, and the robustness of the phase shifter can be improved. Further, when the light guiding structure 104 is prepared, the second substrate 32 may be used as a carrier, and the ground electrode 103, the photo-dielectric layer 102, and the microstrip line 101 are prepared on the second substrate 32 so that the difficulty of preparing the phase shifter is reduced.

It is to be noted that the preceding embodiments are only examples. In the embodiments, those skilled in the art can set the position of the light guiding structure 104 according to the actual requirements. For example, the light guiding structure 104 may also be located on a side of the microstrip line 101 facing away from the ground electrode 103, or a side of the microstrip line 101 facing away from the ground electrode 103 and a side of the microstrip line 101 facing the ground electrode 103 are both provided with the light guiding structure 104 so that light is guided into the photo-dielectric layer 102. In this manner, the dielectric constant of the photo-dielectric layer 102 is controlled to change by light, and thus the phase shift control of the radio frequency signals transmitted on the microstrip line 101 is achieved, which is not limited in embodiments of the present disclosure.

Figure 26:
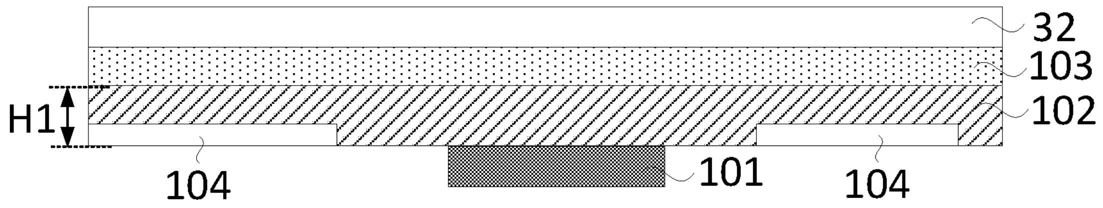
FIG. 26 is a partial sectional diagram of another phase shifter according to an embodiment of the present disclosure.

In an embodiment, the case where the light guiding structure 104 is located on a side of the microstrip line 101 facing the ground electrode 103 is used as an example. As shown in FIG. 25, the light guiding structure 104 may be disposed on a side of the photo-dielectric layer 102 facing away from the microstrip line 101. For example, the light guiding structure 104 is an optical fiber or a light guiding plate disposed on a side of the photo-dielectric layer 102 facing away from the microstrip line 101. FIG. 26 is a partial sectional diagram of another phase shifter according to an embodiment of the present disclosure. As shown in FIG. 26, the light guiding structure 104 may also be disposed on a side of the photo-dielectric layer 102 facing the microstrip line 101. For example, the light guiding structure 104 is an optical fiber or a light guiding plate disposed on a side of the photo-dielectric layer 102 facing the microstrip line 101, which is not limited in embodiments of the present disclosure.

Figure 27:
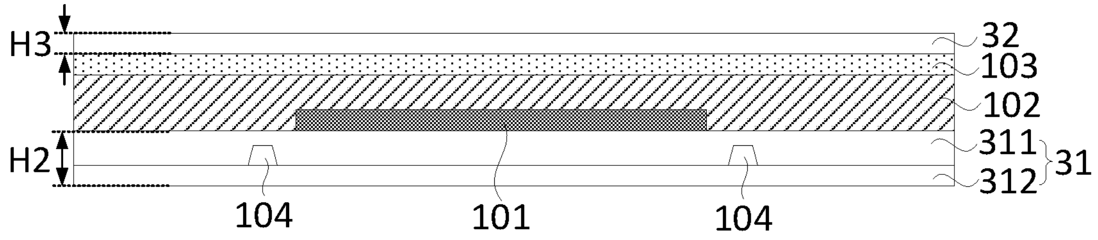
FIG. 27 is a partial sectional diagram of another phase shifter according to an embodiment of the present disclosure.

Based on the preceding embodiment, FIG. 27 is a partial sectional diagram of another phase shifter according to an embodiment of the present disclosure. As shown in FIG. 27, in the case where the light guiding structure 104 is located on a side of the microstrip line 101 facing away from the ground electrode 103 is used as an example, and the second substrate 32 is disposed on a side of the ground electrode 103 facing away from the microstrip line 101 so that the second substrate 32 can support and protect the phase shifter and improve the robustness of the phase shifter. Moreover, when the light guiding structure 104 is prepared, the first substrate 31 may be used as a carrier, and the microstrip line 101 and the photo-dielectric layer 102 are prepared on the first substrate 31; the second substrate 32 may be used as a carrier, and the ground electrode 103 is prepared on the second substrate 32; and then the first substrate 31 and the second substrate 32 are bonded together so that the phase shifter is formed. In this manner, the difficulty of preparing the phase shifter is further prepared.

With continued reference to FIGS. 3-4, 6-8, 11, 14, 16, 18, 22, and 25-26, in an embodiment, the thickness of the photo-dielectric layer 102 is H1, where $0<H1\leq1$ mm.

As shown in FIGS. 3-4, 6-8, 11, 14, 16, 18, 22, and 25-26, if the thickness H1 of the photo-dielectric layer 102 is too great, the loss of the radio frequency signals transmitted on the microstrip line 101 in the photo-dielectric layer 102 is increased. Therefore, in embodiments of the present disclosure, the thickness H1 of the photo-dielectric layer 102 is configured to satisfy $0<H1\leq1$ mm, which is conducive to reducing the loss of the radio frequency signals in the photo-dielectric layer 102 and improving the transmission efficiency of the radio frequency signals.

With continued reference to FIG. 27, in an embodiment, the thickness of the first substrate 31 is H2, and the thickness of the second substrate 32 is H3, where $0<H2\leq2$ mm, and $0<H3\leq2$ mm.

As shown in FIG. 27, if the thickness H2 of the first substrate 31 is too great, the volume of the phase shifter is increased. Therefore, the thickness H2 of the first substrate 31 is configured to satisfy $0<H2\leq2$ mm, which is conducive to reducing the volume of the phase shifter and thus achieving a miniaturized phase shifter. Similarly, if the thickness H3 of the second substrate 32 is too great, the volume of the phase shifter is increased. Therefore, the thickness H3 of the second substrate 32 is configured to satisfy $0<H3\leq2$ mm, which is conducive to reducing the volume of the phase shifter and thus achieving a miniaturized phase shifter.

In an embodiment, the radio frequency signals transmitted on the microstrip line 101 are high frequency signals, for example, the radio frequency signals are high frequency signals with a frequency greater than or equal to 1 GHz. It is to be understood that the radio frequency signals include but are not limited to the preceding examples.

Figure 28:
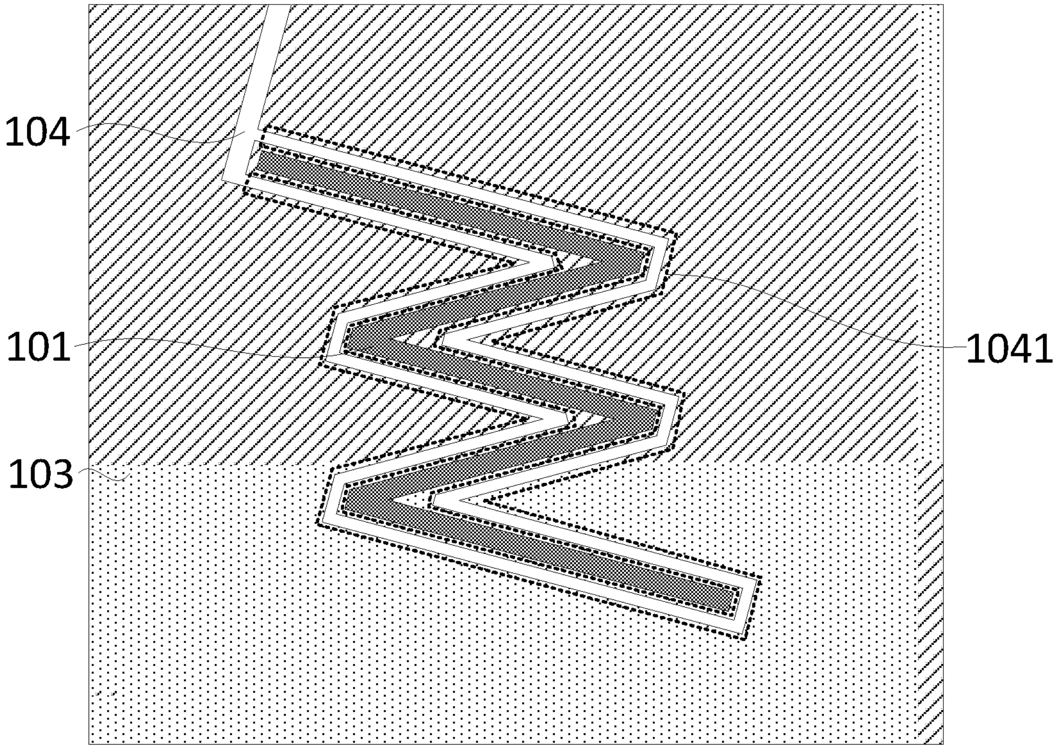
FIG. 28 is a structure diagram of another phase shifter according to an embodiment of the present disclosure.

It is to be noted that those skilled in the art can arbitrarily set the shape of the microstrip line 101 according to the actual requirements. For example, as shown in FIG. 10, the shape of the microstrip line 101 may be a serpentine shape. FIG. 28 is a structure diagram of another phase shifter according to an embodiment of the present disclosure. As shown in FIG. 28, the shape of the microstrip line 101 may also be W-shaped. In other embodiments, the shape of the microstrip line 101 may also be U-shaped, a spiral shape, a comb tooth shape, and a shape of a Chinese character "hui" ("回"), which is not limited in embodiments of the present disclosure.

With continued reference to FIGS. 1 and 3, it is to be noted that the photo-dielectric layer 102 may be disposed as an entire layer or may be disposed separately.

In an embodiment, with continued reference to FIGS. 1 and 3, in the case where the phase shifter includes four phase shifting units 10 is used as an example, and the photo-dielectric layer 102 is disposed as an entire layer. When the phase shifter is prepared, only the entire layer of the photo-dielectric layer 102 needs to be prepared and the photo-dielectric layer 102 does not need to be patterned so that the difficulty of preparing the phase shifter can be reduced.

Figure 29:
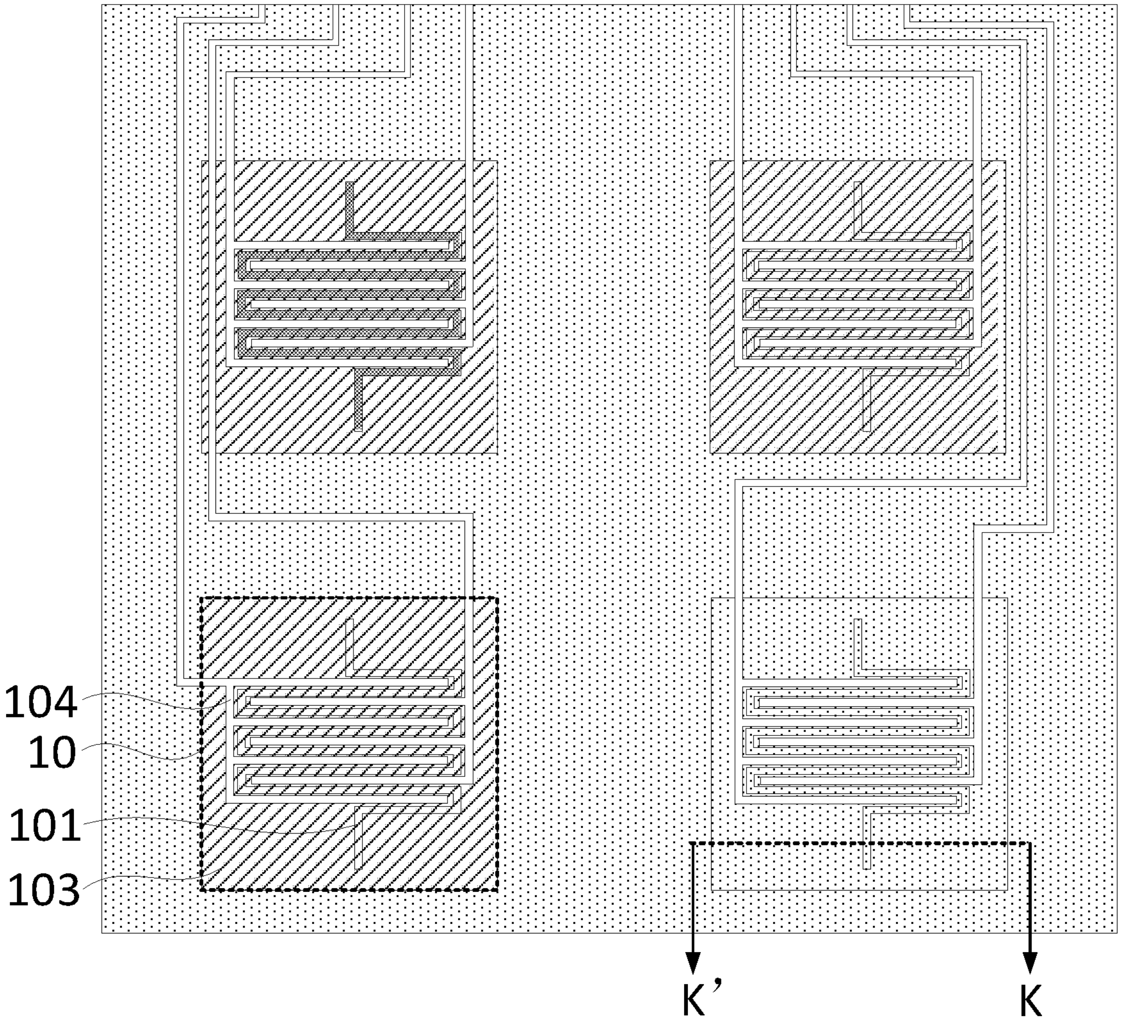
FIG. 29 is a structure diagram of another phase shifter according to an embodiment of the present disclosure.
Figure 30:
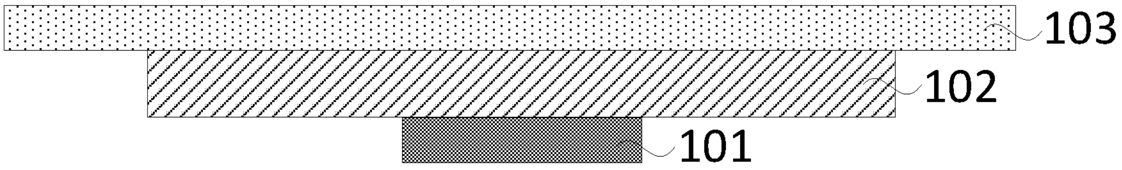
FIG. 30 is a sectional diagram of FIG. 29 taken along the K-K' direction.

FIG. 29 is a structure diagram of another phase shifter according to an embodiment of the present disclosure, and FIG. 30 is a sectional diagram of FIG. 29 taken along the K-K' direction. As shown in FIGS. 29 and 30, in an embodiment, the photo-dielectric layer 102 may also be disposed only in the area where the microstrip line 101 is located so that the material of the photo-dielectric layer 102 can be reduced, which is conducive to reducing the cost of the phase shifter.

The preceding embodiments are only examples. In other embodiments, those skilled in the art can set the position of the photo-dielectric layer 102 according to the actual requirements as long as it is ensured that the photo-dielectric layer 102 at least partially overlaps the microstrip line 101.

Figure 31:
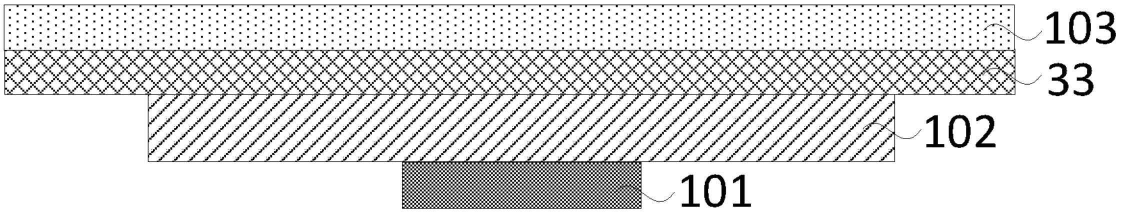
FIG. 31 is a partial sectional diagram of another phase shifter according to an embodiment of the present disclosure.

FIG. 31 is a partial sectional diagram of another phase shifter according to an embodiment of the present disclosure. As shown in FIG. 31, in an embodiment, the phase shifter provided in embodiments of the present disclosure further includes a base substrate 33, and the base substrate 33 is located between the microstrip line 101 and the ground electrode 103 so that the base substrate 33 can support the phase shifter. Moreover, when the phase shifter is prepared, the ground electrode 103 may be prepared on a side of the base substrate 33, and the photo-dielectric layer 102 and the microstrip line 101 may be prepared on the other side of the base substrate 33 so that the difficulty of preparing the phase shifter can be reduced.

Figure 32:
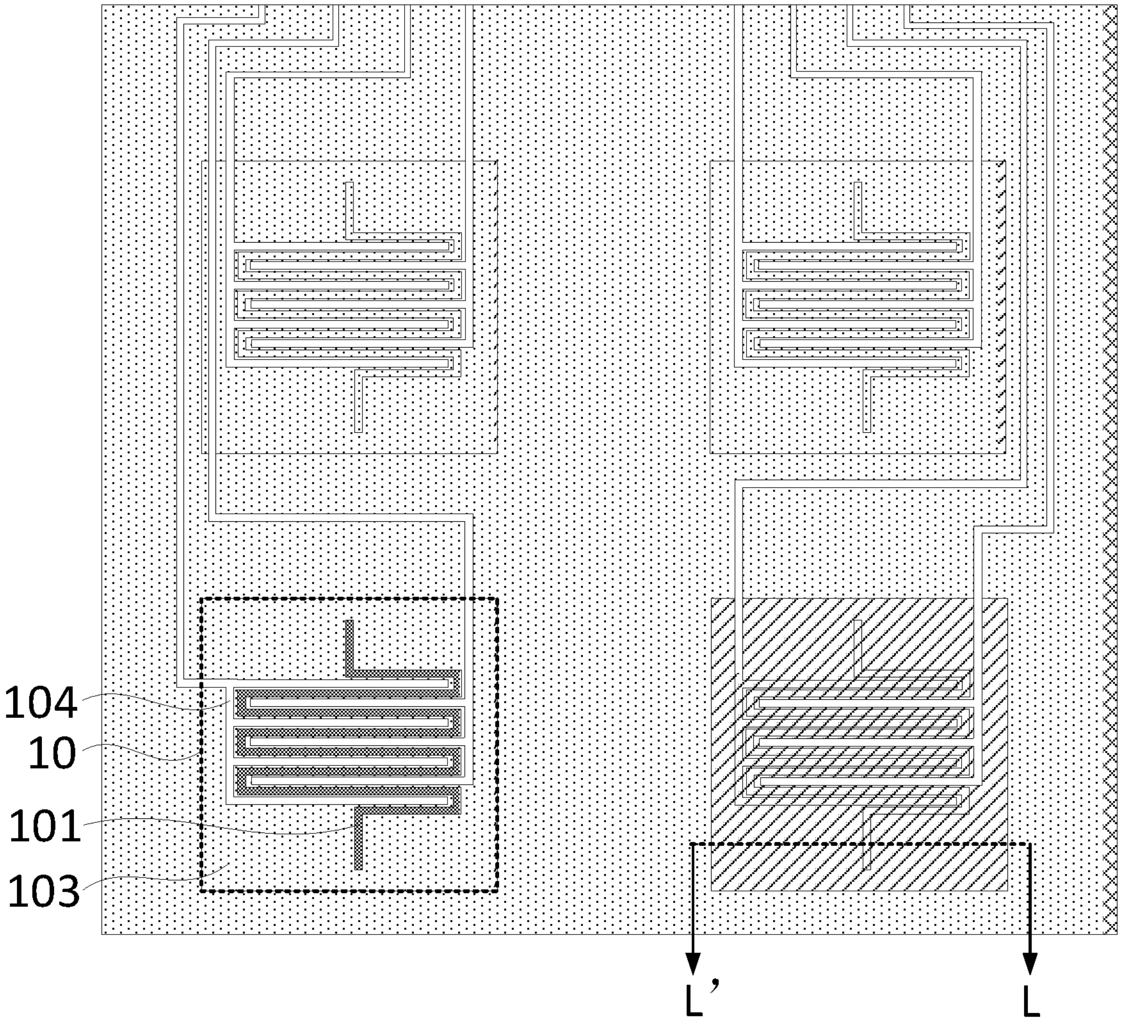
FIG. 32 is a structure diagram of another phase shifter according to an embodiment of the present disclosure.
Figure 33:
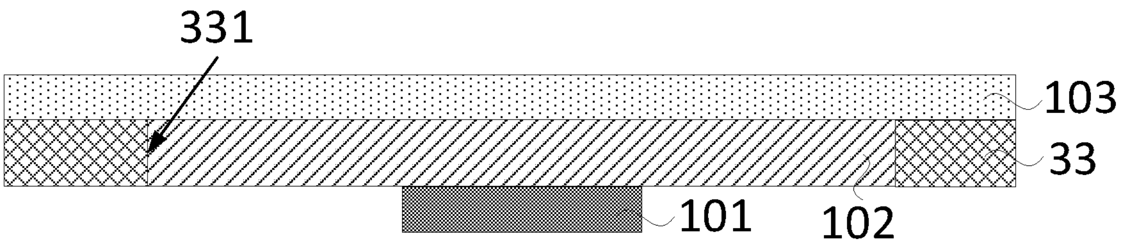
FIG. 33 is a sectional diagram of FIG. 32 taken along the L-L' direction.

FIG. 32 is a structure diagram of another phase shifter according to an embodiment of the present disclosure, and FIG. 33 is a sectional diagram of FIG. 32 taken along the L-L' direction. As shown in FIGS. 32 and 33, in an embodiment, the phase shifter provided in embodiments of the present disclosure further includes the base substrate 33, and the base substrate 33 is arranged in the same layer as the photo-dielectric layer 102. Specifically, as shown in FIGS. 32 and 33, the base substrate 33 includes a fourth hollow portion 331, and the photo-dielectric layer 102 is located in the fourth hollow portion 331 so that the base substrate 33 is arranged in the same layer as the photo-dielectric layer 102. The base substrate 33 may support the phase shifter, and the base substrate 33 is arranged in the same layer as the photo-dielectric layer 102, which is conducive to reducing the thickness of the phase shifter and thus achieving a miniaturized phase shifter.

Based on the same inventive concept, embodiments of the present disclosure also provide an antenna, and the antenna includes the phase shifter described in any embodiment of the present disclosure. Therefore, the antenna provided in embodiments of the present disclosure has the technical effects in the technical solutions of any one of the preceding embodiments, and the same or corresponding structure and the explanation of terms as those in the preceding embodiments will not be repeated here.

Figure 34:
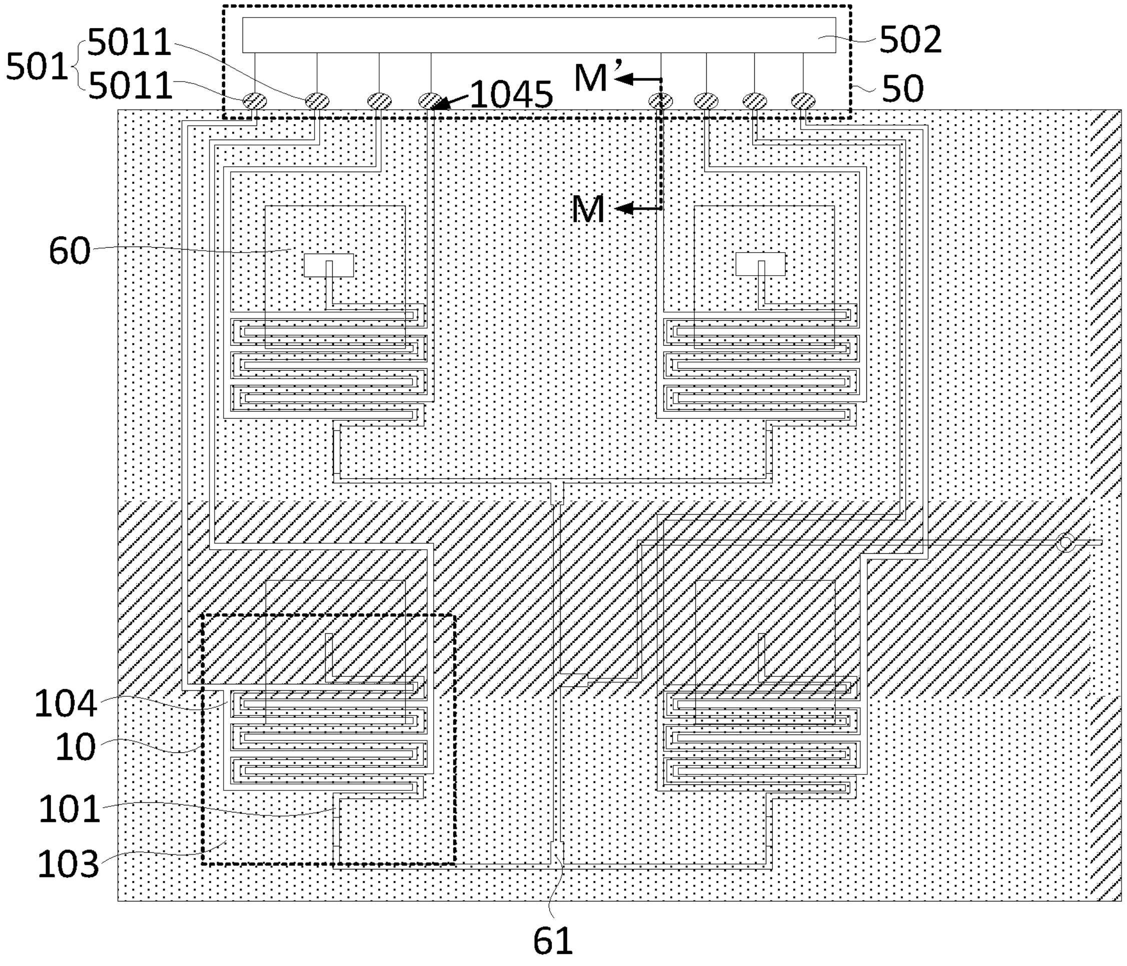
FIG. 34 is a structure diagram of an antenna according to an embodiment of the present disclosure.
Figure 35:
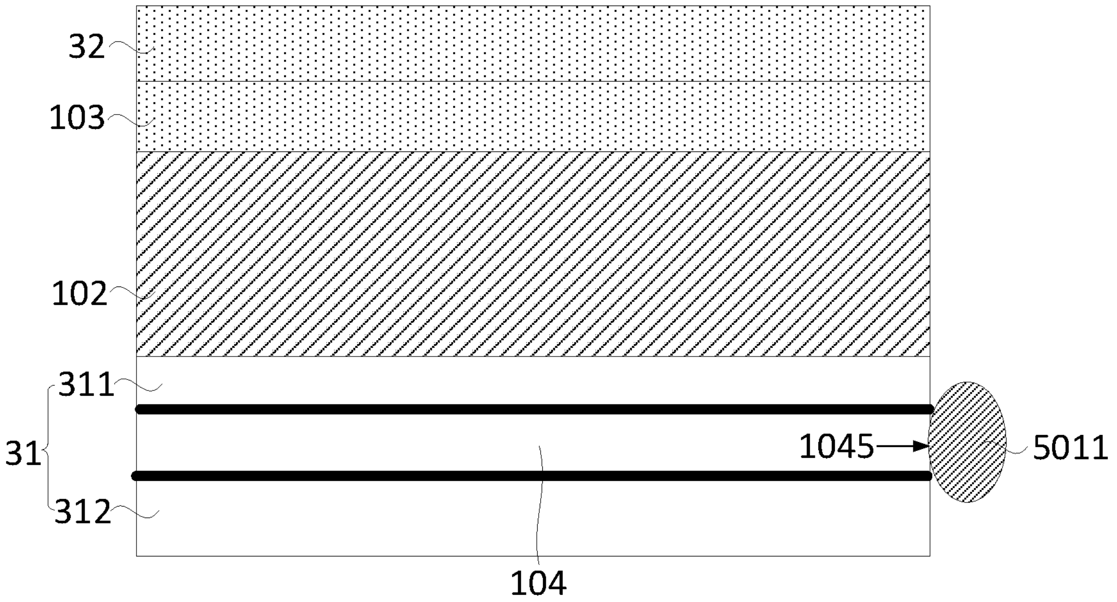
FIG. 35 is a sectional diagram of FIG. 34 taken along the M-M' direction.

FIG. 34 is a structure diagram of an antenna according to an embodiment of the present disclosure, and FIG. 35 is a sectional diagram of FIG. 34 taken along the M-M' direction. As shown in FIGS. 34 and 35, in an embodiment, the antenna provided in embodiments of the present disclosure further includes a light source 50, and the light source 50 is configured to emit light; the light source 50 includes at least one sub-light-source group 501, and the at least one sub-light-source group 501 corresponds to the at least one phase shifting unit 10; the sub-light-source group 501 includes at least one sub-light-source 5011, and the at least one sub-light-source 5011 corresponds to the at least one light guiding structure 104; the at least one light guiding structure 104 includes a light input opening 1045, and each of the at least one sub-light-source 5011 is disposed at the light input opening 1045 of a respective one of the at least one light guiding structure 104.

Specifically, as shown in FIGS. 34 and 35, the antenna includes the light source 50, the light source 50 is configured to emit light, and the light guiding structure 104 guides the light emitted by the light source 50 to introduce the light emitted by the light source 50 into the photo-dielectric layer 102. In this manner, the dielectric constant of the photo-dielectric layer 102 is controlled to change by controlling the light intensity or wavelength of the light emitted by the light source 50, the phase shift of the radio frequency signals transmitted on the microstrip line 101 is performed, and thus the phase shift function of the radio frequency signals is achieved.

With continued reference to FIGS. 34 and 35, the light source 50 includes at least one sub-light-source group 501, and the at least one sub-light-source group 501 is arranged corresponding to the at least one phase shifting unit 10; the sub-light-source group 501 includes at least one sub-light-source 5011, and the at least one sub-light-source 5011 is arranged corresponding to the at least one light guiding structure 104. The number of sub-light-source groups 501 and sub-light-sources 5011 may be set according to the actual requirements. For example, as shown in FIG. 34, the case where the antenna includes four phase shifting units 10 and each phase shifting unit 10 includes two light guiding structures 104 is used as an example, the sub-light-source groups 501 and the phase shifting units 10 are arranged in a one-to-one correspondence, and the sub-light-sources 5011 and the light guiding structures 104 are arranged in a one-to-one correspondence, which is not limited in embodiments of the present disclosure.

With continued reference to FIGS. 34 and 35, the light guiding structure 104 includes the light input opening 1045, and each sub-light-source 5011 is disposed at the light input opening 1045 of a respective light guiding structure 104 so that the light emitted by the sub-light-source 5011 is guided into the light guiding structure 104.

It is to be noted that as for the antenna shown in FIGS. 34 and 35, only the case where the sub-light-source 5011 is disposed on the side of the antenna is used as an example. In other embodiments, the sub-light-source 5011 may be disposed on a side of the microstrip line 101 facing away from the photo-dielectric layer 102 or may be disposed on a side of the ground electrode 103 facing away from the photo-dielectric layer 102. Those skilled in the art can set the position of the sub-light-source 5011 according to the actual requirements.

With continued reference to FIGS. 34 and 35, in an embodiment, the light source 50 further includes a light source control module 502, the sub-light-sources 5011 are all connected to the light source control module 502, and the light source control module 502 is configured to independently control the brightness of the sub-light-sources 5011.

Specifically, as shown in FIGS. 34 and 35, the light source control module 502 is configured to control the brightness of the light emitted by the light source 50 and thus control the light intensity of the light introduced into the photo-dielectric layer 102 in the phase shifting unit 10 so that the dielectric constant of the photo-dielectric layer 102 is changed, the phase shift of the radio frequency signals transmitted on the microstrip line 101 is performed, and thus the phase shift function of the radio frequency signals is achieved. The light source control module 502 independently controls the brightness of the sub-light-sources 5011 so that the phase of the radio frequency signals in each phase shifting unit 10 can be adjusted differently, and thus the required phase shift function is achieved.

It is to be noted that those skilled in the art can arbitrarily set the light source 50 according to the actual requirements. For example, the light source 50 is an LED light bar, which is not limited in embodiments of the present disclosure.

Figure 36:
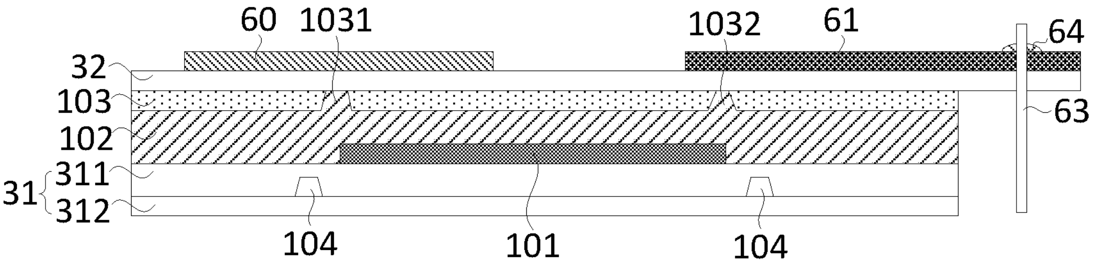
FIG. 36 is a partial sectional diagram of an antenna according to an embodiment of the present disclosure.

FIG. 36 is a partial sectional diagram of an antenna according to an embodiment of the present disclosure. As shown in FIGS. 34 and 36, in an embodiment, the antenna provided in embodiments of the present disclosure further includes a radiation electrode 60, and the ground electrode 103 at least partially overlaps the radiation electrode 60.

Specifically, as shown in FIGS. 34 and 36, the radiation electrode 60 at least partially overlaps the ground electrode 103, and the dielectric constant of the photo-dielectric layer 102 is controlled to change by controlling the light intensity or wavelength of the light; after the phase shift of the radio frequency signals transmitted on the microstrip line 101 is performed, the signals are radiated outward through the radiation electrode 60.

It is to be noted that the radiation electrode 60 at least partially overlaps the ground electrode 103, and it is feasible that the radiation electrode 60 partially overlaps the ground electrode 103; or it is feasible that the radiation electrode 60 is located within the projection of the ground electrode 103. It is to be understood that the radiation electrode 60 at least partially overlaps the ground electrode 103, and it is feasible that along the thickness direction of the ground electrode 103, the radiation electrode 60 at least partially overlaps the ground electrode 103; or it is feasible that the vertical projection of the radiation electrode 60 on the plane where the ground electrode 103 is located at least partially overlaps the ground electrode 103.

With continued reference to FIGS. 34 to 36, in an embodiment, the light guiding structure 104 at least partially overlaps the photo-dielectric layer 102, and the light guiding structure 104 is configured to guide light into the photo-dielectric layer 102 so that the dielectric constant of the photo-dielectric layer 102 is changed, and thus the phase shift control of the radio frequency signals transmitted on the microstrip line 101 is achieved. It is to be understood that the light guiding structure 104 may partially overlap the photo-dielectric layer 102, or the vertical projection of the light guiding structure 104 in the plane where the photo-dielectric layer 102 is located is within the photo-dielectric layer 102; further, it is feasible that along the thickness direction of the photo-dielectric layer 102, the photo-dielectric layer 102 overlaps the light guiding structure 104. Those skilled in the art can set the position of the light guiding structure 104 according to the actual requirements as long as the light may be guided into the photo-dielectric layer 102.

With continued reference to FIGS. 34 and 36, in an embodiment, the phase shifter in the antenna provided in embodiments of the present disclosure further includes the first substrate 31, and the first substrate 31 is located on a side of the microstrip line 101 facing away from the ground electrode 103; the first substrate 31 includes the first sub-substrate 311 and the second sub-substrate 312, and the second sub-substrate 312 is located on a side of the first sub-substrate 311 facing away from the ground electrode 103; the light guiding structure 104 is located on a side of the first sub-substrate 311 facing away from the ground electrode 103. As shown in FIGS. 34 and 36, the light guiding structure 104 is disposed in the first substrate 31. In this manner, the light guiding structure 104 is located on a side of the microstrip line 101 facing away from the ground electrode 103 so that the influence of the light guiding structure 104 on the thickness of the photo-dielectric layer 102 can be avoided, and thus the accuracy of the phase shift of the photo-dielectric layer 102 can be improved.

It is to be noted that as for the antenna shown in FIGS. 34 and 36, only the case where the light guiding structure 104 is located on a side of the first sub-substrate 311 facing away from the ground electrode 103 is used as an example. In other embodiments, the light guiding structure 104 may also be located on a side of the second sub-substrate 312 facing the ground electrode 103. Those skilled in the art can set the position of the light guiding structure 104 according to the actual requirements. With continued reference to FIG. 36, in an embodiment, the phase shifter further includes the second substrate 32, the second substrate 32 is located on a side of the ground electrode 103 facing away from the microstrip line 101, the radiation electrode 60 is located on a side of the second substrate 32 facing away from the microstrip line 101, the ground electrode 103 includes a second hollow portion 1031, and the vertical projection of the radiation electrode 60 on the plane where the ground electrode 103 is located covers the second hollow portion 1031.

Specifically, as shown in FIG. 36, the ground electrode 103 is provided with the second hollow portion 1031, the vertical projection of the radiation electrode 60 on the plane where the ground electrode 103 is located covers the second hollow portion 1031, and the radio frequency signals are transmitted between the microstrip line 101 and the ground electrode 103. After the photo-dielectric layer 102 between the microstrip line 101 and the ground electrode 103 is affected by light, the dielectric constant of the photo-dielectric layer 102 is changed, and the phase shift of the radio frequency signals is performed so that the phases of the radio frequency signals are changed. The phase-shifted radio frequency signals are coupled to the radiation electrode 60 at the second hollow portion 1031 of the ground electrode 103, and the radiation electrode 60 radiates the signals outward.

It is to be noted that the radiation electrode 60 is arranged corresponding to the phase shifting unit 10. For example, the radiation electrodes 60 and the phase shifting units 10 are arranged in a one-to-one correspondence, and the radiation electrodes 60 corresponding to different phase shifting units 10 are insulated from each other.

Figure 37:
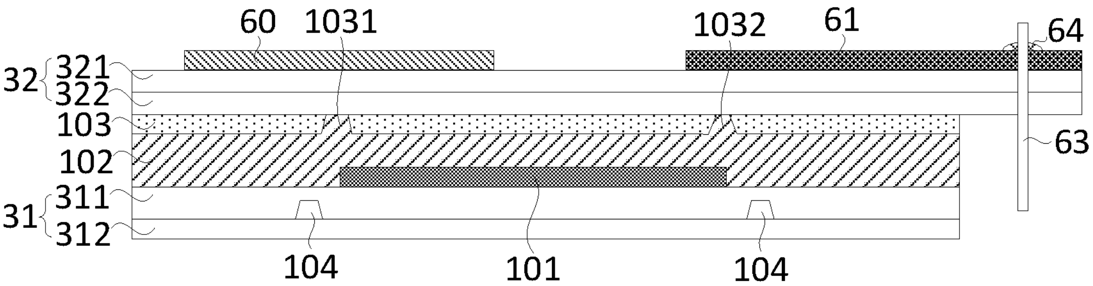
FIG. 37 is a partial sectional diagram of another antenna according to an embodiment of the present disclosure.

FIG. 37 is a partial sectional diagram of another antenna according to an embodiment of the present disclosure. As shown in FIG. 37, in an embodiment, the second substrate 32 includes a fourth sub-substrate 321 and a fifth sub-substrate 322; the fourth sub-substrate 321 is located on a side of the fifth sub-substrate 322 facing away from the microstrip line 101, and the radiation electrode 60 is located on a side of the fourth sub-substrate 321 facing away from the fifth sub-substrate 322; the ground electrode 103 is located on a side of the fifth sub-substrate 322 facing away from the fourth sub-substrate 321.

Specifically, as shown in FIG. 37, the second substrate 32 includes the fourth sub-substrate 321 and the fifth sub-substrate 322. When the antenna is prepared, the radiation electrode 60 may be prepared on a side of the fourth sub-substrate 321, the ground electrode 103 may be prepared on a side of the fifth sub-substrate 322, and then the fourth sub-substrate 321 and the fifth sub-substrate 322 are bonded together. In this manner, the radiation electrode 60 and the ground electrode 103 are respectively located on two sides of the second substrate 32, and compared with the second substrate 32 being a single-layer substrate, the second substrate 32 is configured to include the fourth sub-substrate 321 and the fifth sub-substrate 322, when the antenna is prepared, a double-sided etching process does not need to be performed on the second substrate 32 to form the radiation electrode 60 and the ground electrode 103 so that the manufacturing difficulty of the antenna can be reduced, which is conducive to reducing the cost of the antenna.

With continued reference to FIGS. 34 to 37, in an embodiment, the phase shifter further includes the second substrate 32, and the second substrate 32 is located on a side of the ground electrode 103 facing away from the microstrip line 101; the antenna further includes a feed network 61, and the feed network 61 is located on a side of the second substrate 32 facing away from the microstrip line 101; the ground electrode 103 includes a third hollow portion 1032, and the vertical projection of the feed network 61 on the plane where the ground electrode 103 is located covers the third hollow portion 1032.

As shown in FIGS. 34 to 37, the feed network 61 is configured to transmit the radio frequency signals to each phase shifting unit 10. The feed network 61 may be distributed in an arborescent shape and include multiple branches, and one branch provides the radio frequency signals for one phase shifting unit 10. Specifically, the feed network 61 is located on a side of the second substrate 32 facing away from the microstrip line 101, the ground electrode 103 includes the third hollow portion 1032, and the vertical projection of the feed network 61 on the plane where the ground electrode 103 is located covers the third hollow portion 1032, and the radio frequency signals transmitted by the feed network 61 are coupled to the microstrip line 101 at the third hollow portion 1032 of the ground electrode 103. In this manner, the photo-dielectric layer 102 is affected by light and thus the dielectric constant of the photo-dielectric layer 102 is changed so that the phase shift of the radio frequency signals on the microstrip line 101 is achieved.

Figure 38:
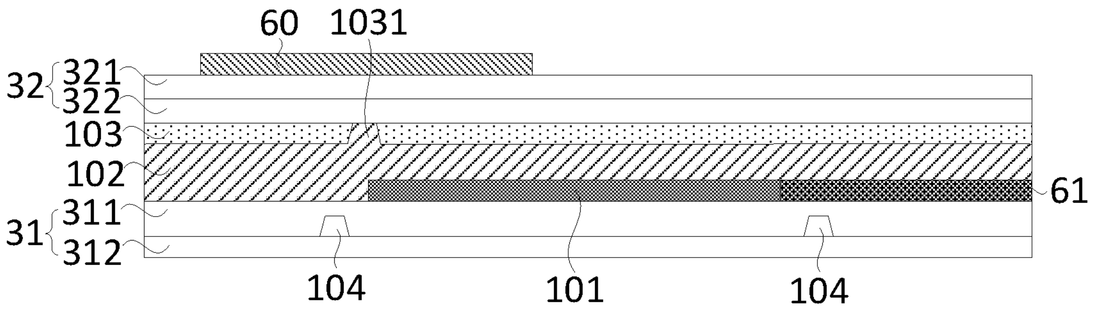
FIG. 38 is a partial sectional diagram of another antenna according to an embodiment of the present disclosure.

FIG. 38 is a partial sectional diagram of another antenna according to an embodiment of the present disclosure. As shown in FIGS. 34 and 38, in an embodiment, the antenna provided in embodiments of the present disclosure further includes the feed network 61, the feed network 61 and the microstrip line 101 are arranged in the same layer, and the feed network 61 is connected to the microstrip line 101.

As shown in FIGS. 34 and 38, the feed network 61 and the microstrip line 101 are arranged in the same layer, and the feed network 61 is directly electrically connected to the microstrip line 101, compared with the case where the radio frequency signals transmitted by the feed network 61 are coupled to the microstrip line 101 through the photo-dielectric layer 102, in this technical solution, the feed network 61 directly transmits the radio frequency signals to the microstrip line 101 without coupling. In this manner, the loss of the radio frequency signals due to coupling can be avoided so that the antenna insertion loss can be reduced and the performance of the antenna can be improved.

With continued reference to FIGS. 36 and 37, in an embodiment, the antenna further includes a radio frequency signal interface 63 and a pad 64. One end of the radio frequency signal interface 63 is connected to the feed network 61 and is fixed by the pad 64, and the other end of the radio frequency signal interface 63 is configured to connect an external circuit such as a high frequency connector.

Figure 39:
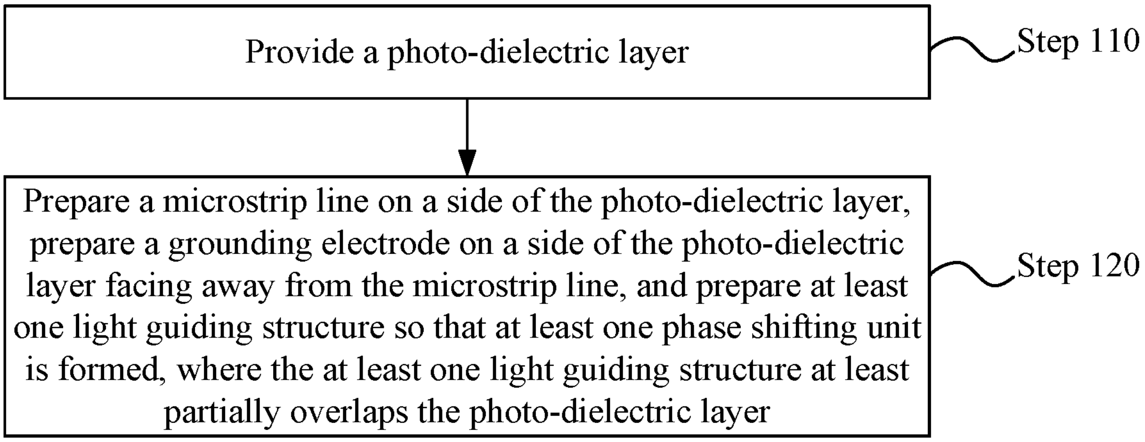
FIG. 39 is a flowchart of a preparation method of a phase shifter according to an embodiment of the present disclosure.

Based on the same inventive concept, embodiments of the present disclosure further provide a preparation method of a phase shifter, which is configured to prepare the phase shifter provided in any one of the preceding embodiments. The same or corresponding structure and the explanation of terms as those in the preceding embodiments will not be repeated here. FIG. 39 is a flowchart of a preparation method of a phase shifter according to an embodiment of the present disclosure. As shown in FIG. 39, the method includes the steps described below.

In step 110, a photo-dielectric layer is provided.

The dielectric constant of the photo-dielectric layer is changed according to the light. For example, the dielectric constant of the photo-dielectric layer may be controlled to change by controlling the light intensity of the light; or the dielectric constant of the photo-dielectric layer may be controlled to change by controlling the wavelength of the light, which is not limited in this embodiment as long as the dielectric constant of the photo-dielectric layer may be changed.

It is to be noted that embodiments of the present disclosure do not limit the material of the photo-dielectric layer, and those skilled in the art can make a selection according to the actual situation as long as the phase shift of radio frequency signals transmitted on the microstrip line may be performed through the photo-dielectric layer to change the phases of the radio frequency signals. In an embodiment, the material of the photo-dielectric layer may include liquid crystal, azo dye, and azo polymer.

In step 120, a microstrip line is prepared on a side of the photo-dielectric layer, aground electrode is prepared on a side of the photo-dielectric layer facing away from the microstrip line, and at least one light guiding structure is prepared so that at least one phase shifting unit is formed, where the at least one light guiding structure at least partially overlaps the photo-dielectric layer.

The microstrip line is prepared on a side of the photo-dielectric layer, and the ground electrode is prepared on a side of the photo-dielectric layer facing away from the microstrip line. The microstrip line is configured to transmit the radio frequency signals so that the radio frequency signals may be transmitted in the photo-dielectric layer between the microstrip line and the ground electrode. Due to the change of the dielectric constant of the photo-dielectric layer (the photo-dielectric layer is affected by the light intensity or wavelength of the light and thus the dielectric constant of the photo-dielectric layer is changed), the phase shift of the radio frequency signals transmitted on the microstrip line occurs so that the phases of the radio frequency signals are changed and the phase shift function of the radio frequency signals is achieved.

Moreover, at least one light guiding structure is prepared, the at least one light guiding structure at least partially overlaps the photo-dielectric layer, and the light is guided into the photo-dielectric layer so that the dielectric constant of the photo-dielectric layer is changed, and thus the phase shift control of the radio frequency signals transmitted on the microstrip line is achieved.

In an embodiment, before the at least one light guiding structure is prepared, the method further includes the step described below.

A first substrate is provided, and the first substrate includes a first sub-substrate and a second sub-substrate.

The step in which the at least one light guiding structure is prepared includes the steps described below.

A groove is prepared on a side of the first sub-substrate, and a first metal reflective layer is prepared on a side of the groove.

The first metal reflective layer is etched so that a light output opening is formed.

A second metal reflective layer is prepared on a side of the second sub-substrate.

The first sub-substrate and the second sub-substrate are bonded together so that the light guiding structure is formed in the first substrate.

Specifically, the groove is prepared on a side of the first sub-substrate, the groove includes a first top surface and a first sidewall, the first metal reflective layer is formed on a side of the groove, the first metal reflective layer covers the first sidewall, and the first metal reflective layer is etched so that the light output opening is formed and the light is output from the light output opening. The second metal reflective layer is prepared on a side of the second sub-substrate, and the first sub-substrate and the second sub-substrate are bonded together so that the second metal reflective layer covers the first top surface and the light guiding structure is formed in the first substrate. The first substrate includes the first sub-substrate and the second sub-substrate, and the light guiding structure is formed between the first sub-substrate and the second sub-substrate so that the manufacturing difficulty of the light guiding structure is reduced.

In an embodiment, before the at least one light guiding structure is prepared, the method further includes the step described below.

A first substrate is provided, and the first substrate includes a first sub-substrate and a second sub-substrate.

The step in which the at least one light guiding structure is prepared includes the steps described below.

A first metal reflective layer is prepared on a side of the first sub-substrate.

The first metal reflective layer is etched so that a light output opening is formed.

A groove is prepared on a side of the second sub-substrate, and a second metal reflective layer is prepared on a side of the groove.

The first sub-substrate and the second sub-substrate are bonded together so that the light guiding structure is formed in the first substrate.

Specifically, the groove is prepared on a side of the second sub-substrate, the groove includes a second top surface and a second sidewall, the second metal reflective layer is formed on a side of the groove, and the second metal reflective layer covers the second sidewall; the first metal reflective layer is disposed on a side of the first sub-substrate, and the first metal reflective layer is etched so that the light output opening is formed and the light is output from the light output opening. The first sub-substrate and the second sub-substrate are bonded together so that the first metal reflective layer covers the second top surface and the light guiding structure is formed in the first substrate. When the first metal reflective layer is etched, since no groove is provided on the first sub-substrate, the first metal reflective layer is located in the same plane so that the etching process can be implemented easily, which is conducive to improving the etching accuracy. Moreover, the first substrate includes the first sub-substrate and the second sub-substrate, and the light guiding structure is formed between the first sub-substrate and the second sub-substrate so that the manufacturing difficulty of the light guiding structure is reduced.

It is to be noted that the preceding are only preferred embodiments of the present disclosure and the technical principles used therein. It is to be understood by those skilled in the art that the present disclosure is not limited to the embodiments described herein. Those skilled in the art can make various apparent modifications, adaptations, and substitutions without departing from the scope of the present disclosure. Therefore, while the present disclosure has been described in detail via the preceding embodiments, the present disclosure is not limited to the preceding embodiments and may include more equivalent embodiments without departing from the inventive concept of the present disclosure. The scope of the present disclosure is determined by the scope of the appended claims.

What is claimed is:

1. A phase shifter, comprising:

at least one phase shifting unit, wherein each phase shifting unit of the at least one phase shifting unit comprises a microstrip line, a photo-dielectric layer, a ground electrode, and at least one light guiding structure, wherein the microstrip line is located on a side of the photo-dielectric layer, and the ground electrode is located on a side of the photo-dielectric layer facing away from the microstrip line; and the at least one light guiding structure at least partially overlaps the photo-dielectric layer, and the at least one light guiding structure is configured to guide light into the photo-dielectric layer, wherein each light guiding structure of the at least one light guiding structure comprises a light output opening, and a vertical projection of the light output opening on a plane where the microstrip line is located does not overlap the microstrip line, and wherein along a direction parallel to a plane where the photo-dielectric layer is located, the light output opening comprises a first boundary, and the first boundary is a boundary of a side of the light output opening facing the microstrip line; the microstrip line comprises a second boundary, the second boundary is a boundary of a side of the microstrip line facing the light output opening, and a shortest distance between the first boundary and the second boundary is D1, wherein $0<D1\leq 2$ mm.

2. The phase shifter of claim 1, wherein the at least one light guiding structure is located on a side of the microstrip line facing away from the ground electrode, and/or the at least one light guiding structure is located on a side of the microstrip line facing the ground electrode.

3. The phase shifter of claim 1, wherein the phase shifter further comprises a second substrate, and the second substrate is located on a side of the ground electrode facing away from the microstrip line.

4. The phase shifter of claim 1, wherein the phase shifter further comprises a first substrate, and the first substrate is located on a side of the microstrip line facing away from the ground electrode; and the at least one light guiding structure is located in the first substrate.

5. The phase shifter of claim 1, wherein the phase shifter further comprises a first substrate, and the first substrate is located on a side of the microstrip line facing away from the ground electrode;

the first substrate comprises a first sub-substrate and a second sub-substrate, and the second sub-substrate is located on a side of the first sub-substrate facing away from the ground electrode;

each light guiding structure of the at least one light guiding structure comprises a groove and a metal reflective layer;

the groove is located on a side of the first sub-substrate facing away from the ground electrode, and/or the groove is located on a side of the second sub-substrate facing the ground electrode; and the metal reflective layer covers a surface of the groove, and the light output opening is disposed on the metal reflective layer on a side of the groove facing the photo-dielectric layer.

6. The phase shifter of claim 5, wherein the groove is located on a side of the first sub-substrate facing away from the ground electrode;

the groove comprises a first top surface and a first sidewall, and the first top surface is located on a side of the groove facing the second sub-substrate;

the metal reflective layer comprises a first metal reflective layer and a second metal reflective layer, the first metal reflective layer covers the first sidewall, and the second metal reflective layer covers the first top surface; the light output opening is disposed on the first metal reflective layer; and the first sub-substrate is a flexible substrate, and the groove is formed by an imprinting process.

7. The phase shifter of claim 5, wherein the groove is located on a side of the second sub-substrate facing the ground electrode;

the groove comprises a second top surface and a second sidewall, and the second top surface is located on a side of the groove facing the first sub-substrate;

the metal reflective layer comprises a first metal reflective layer and a second metal reflective layer, the first metal reflective layer covers the second top surface, and the second metal reflective layer covers the second sidewall; the light output opening is disposed on the first metal reflective layer; and the second sub-substrate is a flexible substrate, and the groove is formed by an imprinting process.

8. The phase shifter of claim 1, wherein the phase shifter further comprises a first substrate, and the first substrate is located on a side of the microstrip line facing away from the ground electrode;

the first substrate comprises a first sub-substrate, a second sub-substrate, and a third sub-substrate, the third sub-substrate is located on a side of the first sub-substrate facing away from the ground electrode, and the second sub-substrate is located on a side of the third sub-substrate facing away from the first sub-substrate;

the third sub-substrate comprises a first hollow portion, a third metal reflective layer is provided on a side of the first hollow portion facing the first sub-substrate, a fourth metal reflective layer is provided on a side of the first hollow portion facing the second sub-substrate, and the light output opening is provided on the third metal reflective layer;

a light blocking layer is provided on a sidewall of the first hollow portion; and a material of the third sub-substrate is an opaque material.

9. The phase shifter of claim 1, wherein
the phase shifter further comprises a spacing structure, wherein the spacing structure is located between the microstrip line and the ground electrode; and
the spacing structure is located among the at least one phase shifting unit.

10. A preparation method of a phase shifter comprising:
providing a photo-dielectric layer; and
preparing a microstrip line on a side of the photo-dielectric layer, preparing a ground electrode on a side of the photo-dielectric layer facing away from the microstrip line, and preparing at least one light guiding structure to form at least one phase shifting unit, wherein the at least one light guiding structure at least partially overlaps the photo-dielectric layer,
wherein before preparing the at least one light guiding structure, the method further comprises:
providing a first substrate, wherein the first substrate comprises a first sub-substrate and a second sub-substrate; and
wherein preparing the at least one light guiding structure comprises:
preparing a groove on a side of the first sub-substrate, and preparing a first metal reflective layer on a side of the groove;
etching the first metal reflective layer to form a light output opening;
preparing a second metal reflective layer on a side of the second sub-substrate; and
bonding the first sub-substrate and the second sub-substrate to form the at least one light guiding structure in the first substrate.

11. An antenna comprising a phase shifter, wherein the phase shifter comprises:
at least one phase shifting unit, wherein each phase shifting unit of the at least one phase shifting unit comprises a microstrip line, a photo-dielectric layer, a ground electrode, and at least one light guiding structure,
wherein the microstrip line is located on a side of the photo-dielectric layer, and the ground electrode is located on a side of the photo-dielectric layer facing away from the microstrip line; and
the at least one light guiding structure at least partially overlaps the photo-dielectric layer, and the at least one light guiding structure is configured to guide light into the photo-dielectric layer,
wherein each light guiding structure of the at least one light guiding structure comprises a light output opening, and a vertical projection of the light output opening on a plane where the microstrip line is located does not overlap the microstrip line, and
wherein along a direction parallel to a plane where the photo-dielectric layer is located, the light output opening comprises a first boundary, and the first boundary is a boundary of a side of the light output opening facing the microstrip line; the microstrip line comprises a second boundary, the second boundary is a boundary of a side of the microstrip line facing the light output opening, and a shortest distance between the first boundary and the second boundary is D1, wherein $0<D1\leq 2$ mm.

12. The antenna of claim 11, wherein
the antenna further comprises a light source, and the light source is configured to emit light;
the light source comprises at least one sub-light-source group, and the at least one sub-light-source group corresponds to the at least one phase shifting unit; each sub-light-source group of the at least one sub-light-source group comprises at least one sub-light-source, and the at least one sub-light-source corresponds to the at least one light guiding structure;
each of the at least one sub-light-source is disposed at the light input opening of a respective one of the at least one light guiding structure; and
the light source further comprises a light source control module, each of the at least one sub-light-source is connected to the light source control module, and the light source control module is configured to independently control brightness of the at least one sub-light-source.

13. The antenna of claim 11, wherein
the antenna further comprises a radiation electrode, and the ground electrode at least partially overlaps the radiation electrode.

14. The antenna of claim 13, wherein
the phase shifter further comprises a second substrate, and the second substrate is located on a side of the ground electrode facing away from the microstrip line;
the radiation electrode is located on a side of the second substrate facing away from the microstrip line; and
the ground electrode comprises a second hollow portion, and a vertical projection of the radiation electrode on a plane where the ground electrode is located covers the second hollow portion.

15. The antenna of claim 14, wherein
the second substrate comprises a fourth sub-substrate and a fifth sub-substrate, and the fourth sub-substrate is located on a side of the fifth sub-substrate facing away from the microstrip line;
the radiation electrode is located on a side of the fourth sub-substrate facing away from the fifth sub-substrate, and the ground electrode is located on a side of the fifth sub-substrate facing away from the fourth sub-substrate; and
the antenna further comprises a feed network, the feed network and the microstrip line are arranged in a same layer, and the feed network is connected to the microstrip line.

16. The antenna of claim 15, wherein
the phase shifter further comprises the second substrate, and the second substrate is located on a side of the ground electrode facing away from the microstrip line;
the antenna further comprises a feed network, the feed network is located on a side of the second substrate facing away from the microstrip line; and
the ground electrode comprises a third hollow portion, and a vertical projection of the feed network on the plane where the ground electrode is located covers the third hollow portion.

* * * * *